US011679838B2

(12) United States Patent
Zawistowski

(10) Patent No.: US 11,679,838 B2
(45) Date of Patent: Jun. 20, 2023

(54) LINEAR DERAILLEUR MECHANISM

(71) Applicant: YETI DESIGN, LLC, Golden, CO (US)

(72) Inventor: Peter Zawistowski, Lakewood, CO (US)

(73) Assignee: YETI DESIGN, LLC, Golden, CO (US)

( * ) Notice: Subject to any disclaimer, the term of this patent is extended or adjusted under 35 U.S.C. 154(b) by 175 days.

(21) Appl. No.: 17/140,715

(22) Filed: Jan. 4, 2021

(65) Prior Publication Data

US 2021/0171157 A1   Jun. 10, 2021

Related U.S. Application Data

(63) Continuation of application No. 16/000,325, filed on Jun. 5, 2018, now Pat. No. 10,894,575, which is a
(Continued)

(51) Int. Cl.
*B62M 9/1242* (2010.01)
*B62M 9/122* (2010.01)
(Continued)

(52) U.S. Cl.
CPC .......... *B62M 9/1242* (2013.01); *B62M 9/122* (2013.01); *B62M 9/1342* (2013.01); *B62M 9/132* (2013.01)

(58) Field of Classification Search
CPC .... B62M 9/124; B62M 9/126; B62M 9/1242; B62M 9/1342; B62M 9/136; B62M 9/134; B62M 9/121
(Continued)

(56) References Cited

U.S. PATENT DOCUMENTS 3,677,103 A * 7/1972 Huret ...................... B62M 9/16
474/134
3,803,933 A * 4/1974 Huret ................... B62M 9/1242
474/82
(Continued)

FOREIGN PATENT DOCUMENTS

EP   2465761 A1   6/2012
EP   2540609 A1   1/2013
(Continued)

OTHER PUBLICATIONS

Chen, "Design of Structural Mechanisms", A dissertation submitted for the degree of Doctor of Philosophy in the Department of Engineering Science at the University of Oxford, St Hugh's College, 2003, 160 Pages.
(Continued)

*Primary Examiner* — Henry Y Liu
(74) *Attorney, Agent, or Firm* — Dorsey & Whitney LLP

(57) ABSTRACT

A derailleur system is provided that moves the derailleur cage in a substantially rectilinear path. The derailleur is mounted to a frame having a gear cassette mounted thereon. The gear cassette includes an axis of rotation. The derailleur includes a drive member engaging the gear cassette. The derailleur is positioned on the frame adjacent the gear cassette, and including a spatial linkage having a stationary link, a floating link, and a cage assembly having two pulleys each defining an axis of rotation. The drive member engages each of the pulleys. The path of the floating link is substantially linear through substantially its entire range of motion and variously aligns at least one of the pulleys with the gear cassette.

20 Claims, 18 Drawing Sheets

Related U.S. Application Data continuation of application No. 14/965,648, filed on Dec. 10, 2015, now Pat. No. 10,011,325.

(60) Provisional application No. 62/090,220, filed on Dec. 10, 2014.

(51) Int. Cl.
*B62M 9/1342* (2010.01)
*B62M 9/132* (2010.01)

(58) Field of Classification Search
USPC .................................................. 474/80, 82
See application file for complete search history.

(56) References Cited

U.S. PATENT DOCUMENTS

| | | | |
|---|---|---|---|
| 3,813,955 A | 6/1974 | Huret et al. | |
| 3,847,028 A * | 11/1974 | Bergles | B62M 9/1248 474/80 |
| 4,241,617 A | 12/1980 | Fujimoto et al. | |
| 4,279,172 A | 7/1981 | Nagano et al. | |
| 4,500,302 A * | 2/1985 | Crepin | B62M 9/1242 474/82 |
| RE32,059 E | 12/1985 | Nagano | |
| 4,586,913 A | 5/1986 | Nagano | |
| 4,619,633 A | 10/1986 | Nagano | |
| 4,701,152 A * | 10/1987 | Dutil | B62M 9/123 474/70 |
| RE32,924 E | 5/1989 | Nagano | |
| 4,878,884 A | 11/1989 | Romano | |
| 4,973,215 A * | 11/1990 | Karlen | B25J 9/04 901/15 |
| 5,452,910 A | 9/1995 | Harris | |
| 5,494,307 A * | 2/1996 | Anderson | B62M 9/122 280/236 |
| 5,597,366 A | 1/1997 | Ozaki | |
| 5,607,367 A * | 3/1997 | Patterson | B62M 9/134 474/80 |
| 5,649,877 A * | 7/1997 | Patterson | B62M 9/1344 474/80 |
| 5,688,200 A * | 11/1997 | White | B62M 9/124 474/119 |
| 5,816,966 A | 10/1998 | Yang et al. | |
| 6,012,999 A * | 1/2000 | Patterson | B62M 9/122 474/104 |
| 6,093,122 A * | 7/2000 | McLaughlin | B62M 9/1248 474/82 |
| 6,325,733 B1 * | 12/2001 | Patterson | B62M 9/132 280/216 |
| 6,454,671 B1 * | 9/2002 | Wickliffe | F16H 7/22 474/82 |
| 6,629,903 B1 * | 10/2003 | Kondo | B62M 9/136 474/82 |
| 6,793,598 B1 * | 9/2004 | Savard | B62M 9/1248 474/81 |
| 6,902,504 B2 | 6/2005 | Fukuda | |
| 7,025,698 B2 | 4/2006 | Wickliffe | |
| 7,104,908 B2 | 9/2006 | Nagano | |
| 7,674,198 B2 * | 3/2010 | Yamaguchi | B62M 9/16 474/82 |
| 7,722,488 B2 * | 5/2010 | Kunisawa | B62M 9/121 474/82 |
| 7,914,407 B2 | 3/2011 | Fukushima et al. | |
| 7,951,028 B2 | 5/2011 | Wickliffe | |
| 8,007,383 B2 * | 8/2011 | Watarai | B62M 9/1242 474/81 |
| 8,012,052 B2 * | 9/2011 | Shahana | B62M 9/1242 474/82 |
| 8,303,443 B2 | 11/2012 | Wickliffe et al. | |
| 8,419,573 B2 * | 4/2013 | Yamaguchi | B62M 9/127 267/155 |
| 8,678,962 B2 | 3/2014 | Jordan | |
| 8,932,162 B2 | 1/2015 | Emura et al. | |
| 9,033,833 B2 | 5/2015 | Johnson et al. | |
| 9,102,379 B2 | 8/2015 | Capogna | |
| 9,127,766 B2 * | 9/2015 | Kuwayama | B62M 9/132 |
| 9,327,792 B2 | 5/2016 | Johnson et al. | |
| 9,457,871 B2 | 10/2016 | Kuwayama et al. | |
| 9,505,462 B2 * | 11/2016 | Pasqua | B62M 9/125 |
| 9,637,199 B2 | 5/2017 | Pasqua et al. | |
| 9,676,446 B2 | 6/2017 | Pasqua et al. | |
| 9,758,217 B2 | 9/2017 | Bortoli et al. | |
| 9,919,765 B2 | 3/2018 | Wickliffe et al. | |
| 10,011,325 B2 | 7/2018 | Zawistowski | |
| 2002/0177498 A1 * | 11/2002 | Wickliffe | B62M 9/137 474/82 |
| 2004/0106482 A1 * | 6/2004 | Nagano | B62M 9/1242 474/82 |
| 2005/0176537 A1 * | 8/2005 | Matsumoto | B62M 11/145 474/80 |
| 2006/0019782 A1 * | 1/2006 | Wickliffe | B62M 9/134 474/80 |
| 2010/0075788 A1 * | 3/2010 | Wickliffe | B62M 9/1342 474/80 |
| 2012/0083372 A1 * | 4/2012 | Yamaguchi | B62M 9/126 474/80 |
| 2012/0142466 A1 * | 6/2012 | Lin | B62M 9/124 474/80 |
| 2012/0214628 A1 * | 8/2012 | Johnson | B62M 9/1244 474/80 |
| 2013/0137541 A1 * | 5/2013 | Johnson | B62K 23/04 474/80 |
| 2013/0252772 A1 * | 9/2013 | Scolari | B62M 9/04 474/80 |
| 2013/0310204 A1 * | 11/2013 | Shahana | B62M 9/121 474/80 |
| 2014/0155206 A1 * | 6/2014 | Johnson | B62K 23/06 474/80 |
| 2014/0243129 A1 * | 8/2014 | Pasqua | B62M 9/1248 474/82 |
| 2014/0274507 A1 * | 9/2014 | Wickliffe | B62M 9/135 474/80 |
| 2014/0318306 A1 * | 10/2014 | Tetsu | B62M 25/08 74/502.2 |

FOREIGN PATENT DOCUMENTS

| | | |
|---|---|---|
| EP | 3230157 B1 | 7/2021 |
| JP | H0725378 A | 1/1995 |

OTHER PUBLICATIONS

International Bureau, "International Search Report and Written Opinion", PCT Patent Application No. PCT/US2015/065090, dated Feb. 23, 2016, 11 Pages.

Li, "Movable Spatial 6R Linkages", XP055249075, Retrieved from the Internet on Oct. 13, 2016: URL:http://people.ricam.oeaw.ac.at/z.li/pu blications/talks/6.pdf, Oct. 2, 2013, 48 Pages.

Sarrut, "Note Sur La Transformation Des Mouvements Rectilignes Alternatifs", Academie des Sciences, 36, 1036-1038, 1853, 5 Pages.

Zawistowski, "Quantifying Wheel Path", Think Turquoise, http://www.yeticycles.com/blog/?p=237 [Retrieved from the Internet on Jul. 27, 2011], Jul. 18, 2010, 4 Pages.

\* cited by examiner

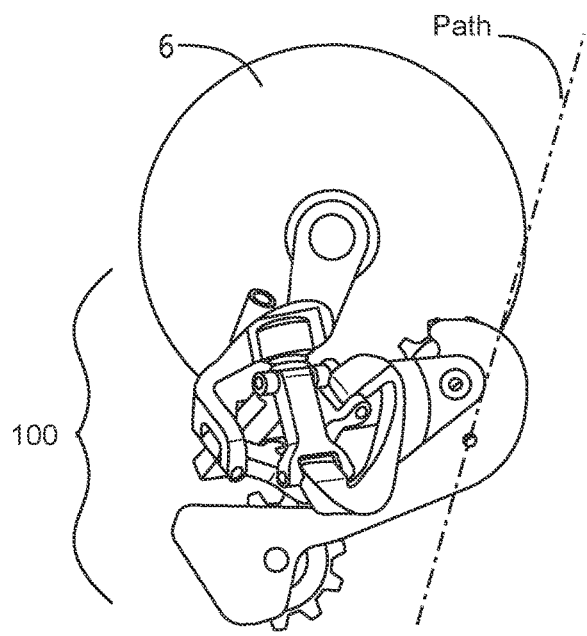
FIG. 5A
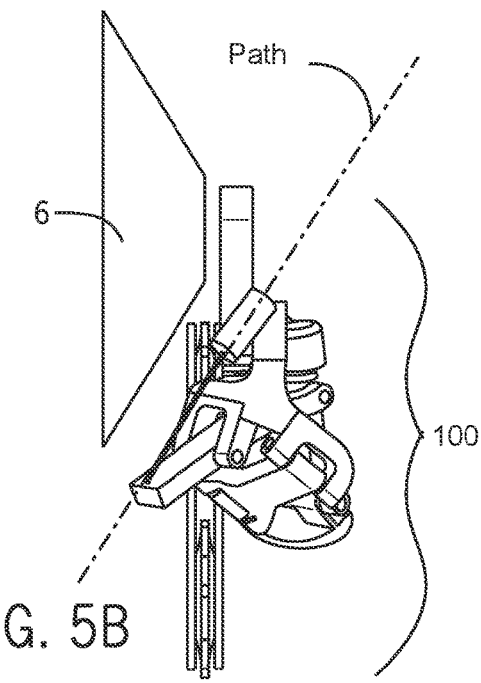
FIG. 5B
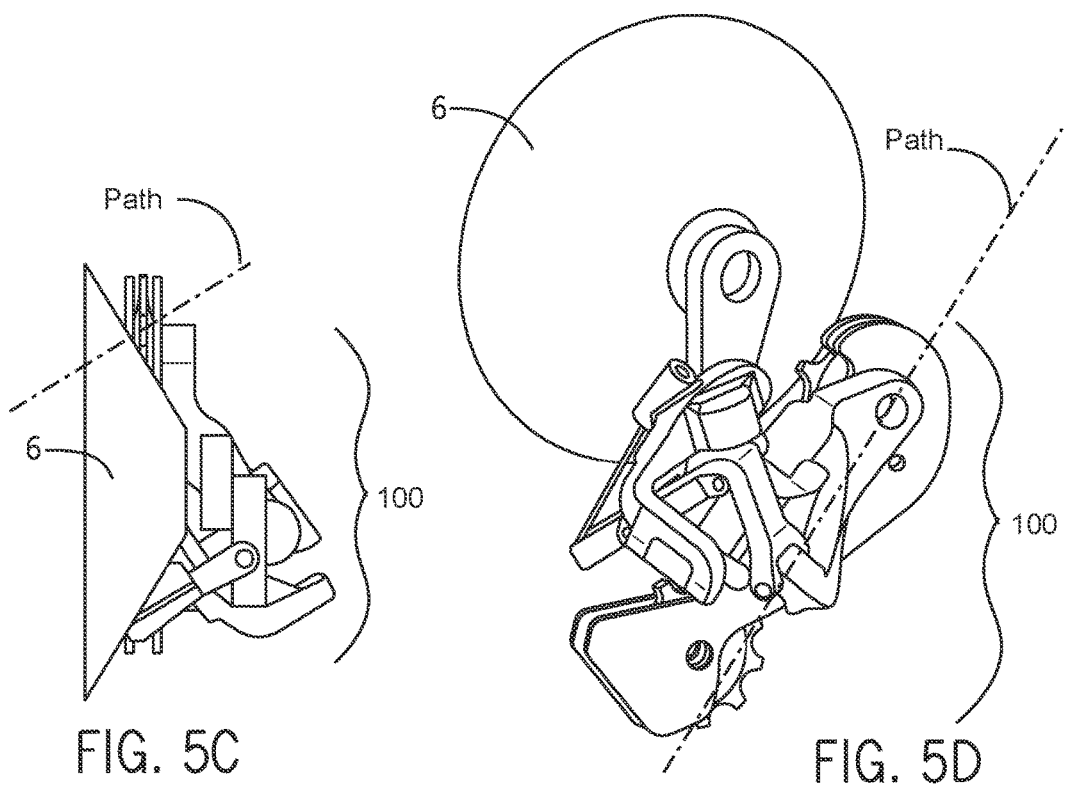
FIG. 5C
FIG. 5D

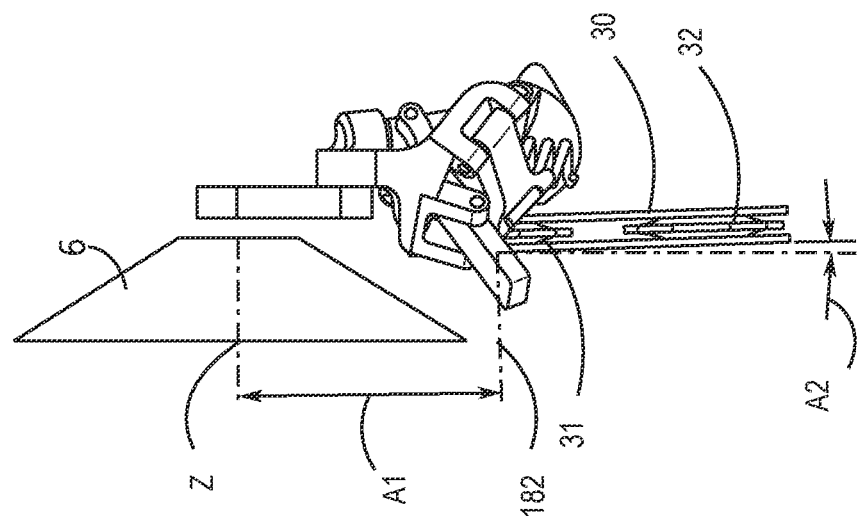
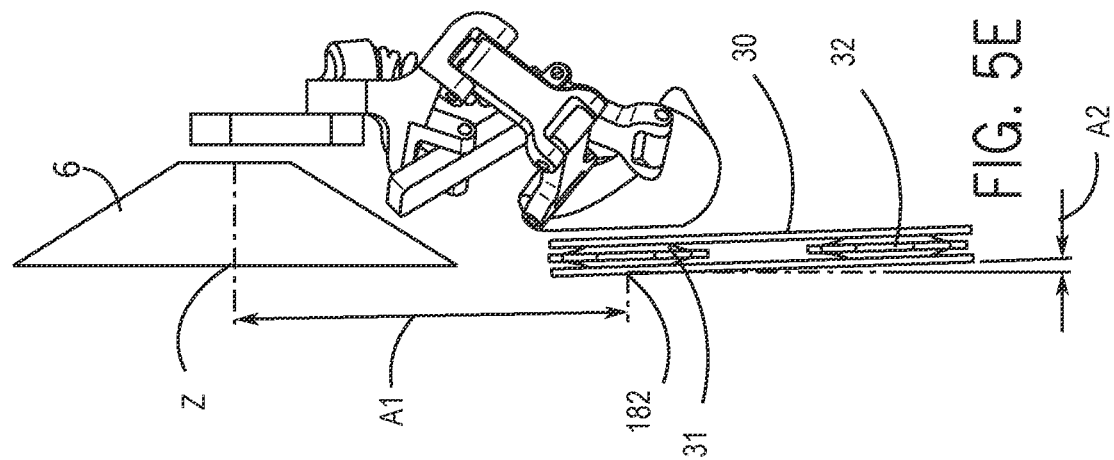

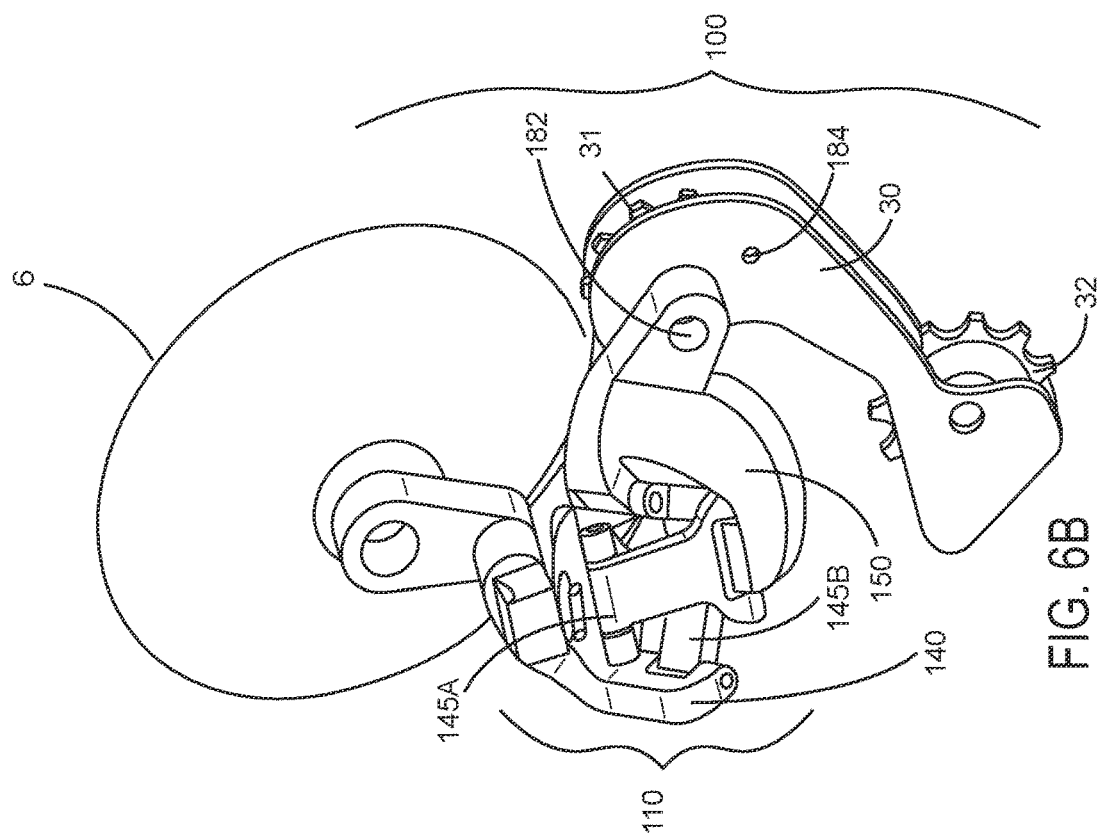
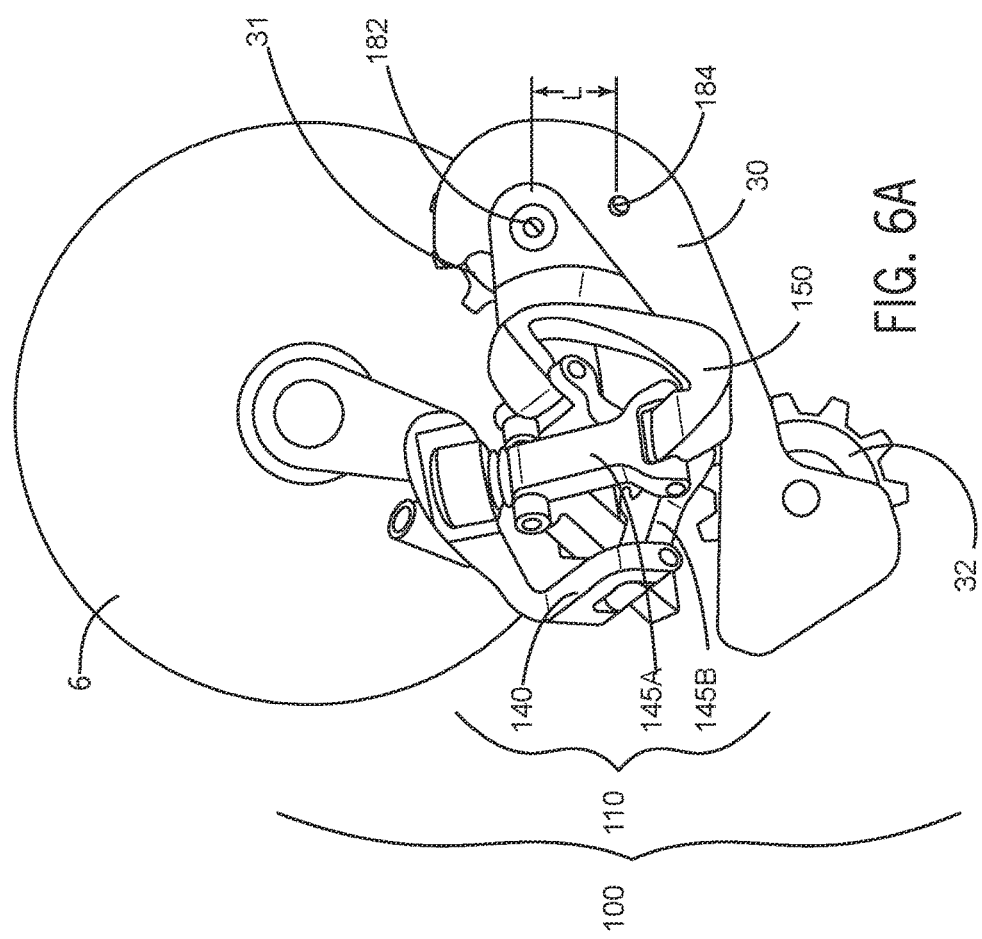

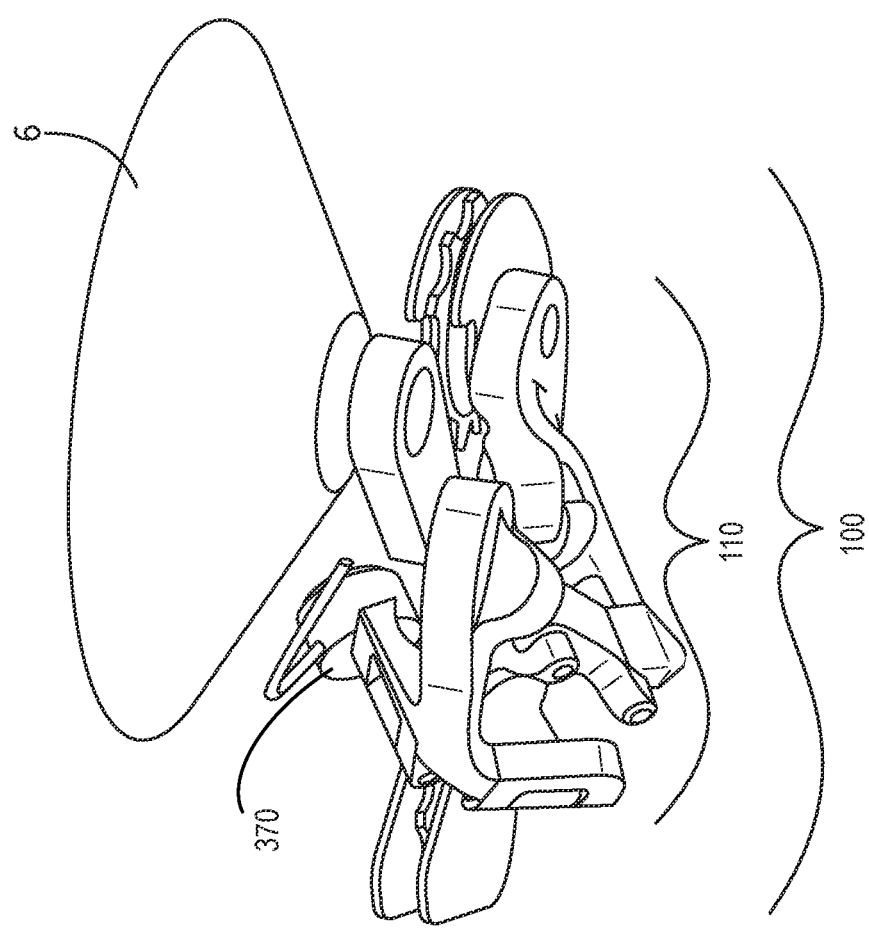
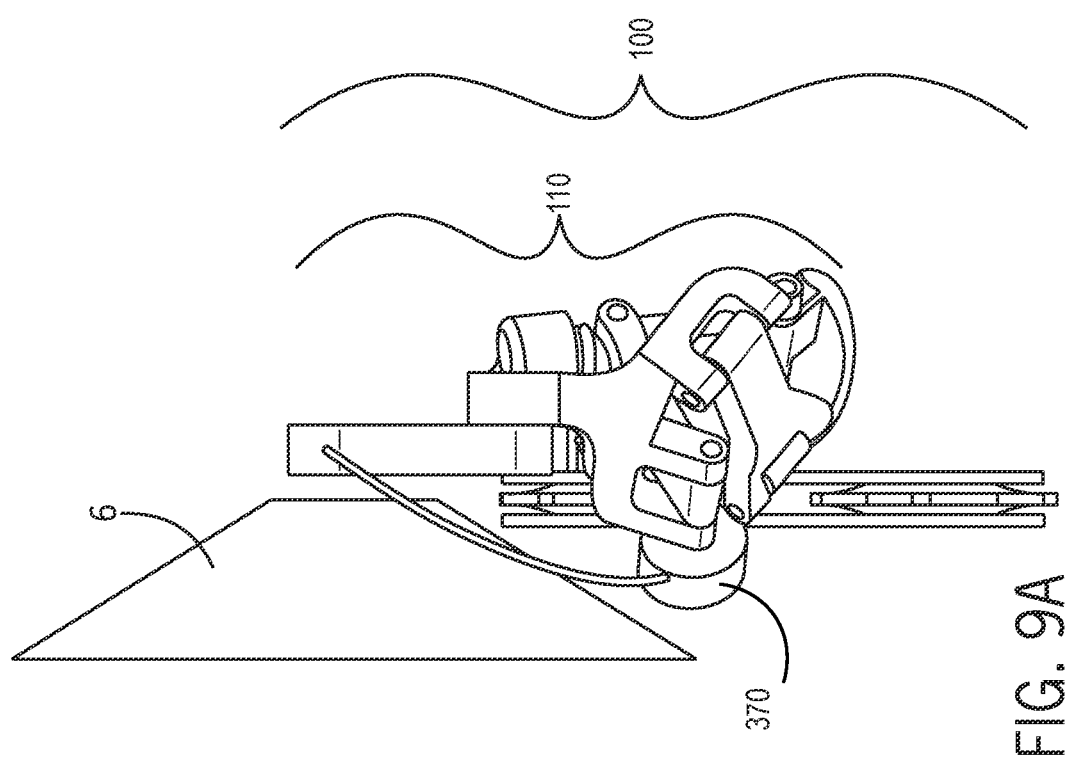
FIG. 9B
FIG. 9A

LINEAR DERAILLEUR MECHANISM

CROSS-REFERENCE TO RELATED APPLICATIONS

This application is a continuation of U.S. application Ser. No. 16/000,325, filed Jun. 5, 2018, entitled "Linear Derailleur Mechanism, which is a continuation of U.S. application Ser. No. 14/965,648, filed Dec. 10, 2015, entitled "Linear Derailleur Mechanism," now U.S. Pat. No. 10,011,325, issued Jul. 3, 2018, which claims the benefit of U.S. Provisional Application No. 62/090,220 filed on, Dec. 10, 2014, entitled "Linear Derailleur Mechanism," all of which are hereby incorporated by reference in their entirety and for all purposes.

TECHNICAL FIELD

Discussed herein is a bicycle derailleur and, with more particularity, a derailleur that operates in a linear motion shifting the bicycle drive between cassette cogs.

BACKGROUND

Bicycles are commonly provided with a series of parallel cogs/sprockets of varying diameter/tooth-counts fixed to the rear wheel of the bicycle concentric to the wheel axis, also considered a rear gear cassette. The cogs are typically arranged in a cone-like shape from small gear to large gear. A bicycle rider transfers power via the cranks (having a crank axis) in which a front chain ring is fixed. The front chain ring may include more than one cog/sprocket having differing sizes (e.g. also forming a cone) and be considered a front gear cassette. A drive chain/belt travels over the chain/belt ring to one of the rear cogs in a closed loop, driving the rear wheel.

The gear ratio between the front chain ring (power input) and rear wheel (power output) is determined by which rear cog the drive chain/belt has engaged. An example of a prior art rear derailleur used to shift the chain/belt is disclosed in FIG. 1. The rear derailleur 10 is a linkage mechanism that controls the position of the drive chain/belt 5 relative to individual cogs/sprockets 6 of the rear wheel. Currently, a linkage used in a rear derailleur 10 such as those commonly used today is a 2-dimensional planar 4-bar linkage 11 having a parallelogram structure. The resultant path of the floating link 20 of this mechanism is non-linear, forming a curved or arcuate path. As a result, the angle of the derailleur pulley axes 17, 19 are not constant relative to the wheel axis 7 in at least one reference plane throughout the entire travel range, which can create undesirable forces and negatively affect performance and wear and tear on the components. The wheel axis 7 is the axis defined by the rotation of the wheel hub 2.

Typical rear derailleurs 10 have of a parallelogram linkage 11 as shown in FIG. 1. One link, the stationary link 14, is fixed or pivotally mounted at connection 12 to the rear derailleur hanger 3 of the bicycle rear triangle 1 or swingarm, or to the rear triangle/swingarm itself. Two parallel links 16, 18 connect the floating link 20 to the stationary link 14. An actuation force is applied to change the position of the mechanism, typically via a cable. A return spring is connected to the parallelogram providing a force opposite to that of the actuation force. A derailleur cage assembly 30 is pivotably connected to the floating link 20. The derailleur cage assembly includes an upper pulley or jockey pulley 31, and a lower pulley or idler pulley 32.

Currently the most common linkage design used in rear derailleurs today is a planar 4-bar linkage parallelogram. There are several disadvantages to this mechanism. For example, the resultant path this linkage defines is non-linear curved. As a result, the angular relationship of the derailleur pulley axes 17, 19 varies with respect to the wheel axis 7 throughout the range of motion. The inherent geometry of the parallelogram leaves little freedom of the linkage mounting location relative to the rear wheel to achieve the desired linkage path. This limited freedom correspondingly limits frame designers options, whereas more freedom of this mounting location would give frame designer more options.

As noted previously, derailleur linkages 11 are activated via an actuation force to move the mechanism through its travel. Moving the mechanism through its travel causes the chain 5 to shift from one wheel cog in the cassette 6 to another wheel cog. One end of the actuation cable is connected to one of the non-stationary links 20 and the other to the stationary link 14 or bike frame itself. With a parallelogram design, the mechanism's linkage path is dependent upon the link lengths and axes geometry. In order to achieve an optimum linkage path and actuation ratio in a parallelogram mechanism, it is common to add additional complex features such as pulley wheels and extended links. These items add weight and complexity.

The inherent geometry of the parallelogram leaves little freedom to minimize the mechanism's volume envelope and envelope position relative to the drive side frame dropout. It is desirable to have a compact mechanism located as inboard as possible to the frame to minimize the chance of hitting the derailleur on an obstacle while riding, which can prove difficult to achieve with this design.

A mechanism that offers various solutions to the inherent mechanical limitations of a parallelogram design discussed above is desired.

SUMMARY

In accordance with various embodiments, a bicycle may include a frame having a gear cassette mounted thereon, the gear cassette having an axis of rotation, and a drive member engaging the gear cassette. The bicycle may also include a derailleur positioned on the frame adjacent the gear cassette, and including a linear linkage. The linear linkage may include a stationary link and a floating link. The derailleur may include a cage assembly having two pulleys each defining an axis of rotation. The drive member may engage each of the pulleys. The path of the floating link may be substantially linear through substantially all of its range of motion.

In accordance with various embodiments, the gear cassette may be a rear gear cassette operably associated with a rear wheel. The gear cassette is a front chain ring set operably associated with a crank. The pulley axes of the cage assembly may be parallel to the axis of rotation of the gear cassette and remains parallel to the axis of rotation of the gear cassette throughout its entire range of motion. The pulley axes of the cage assembly is not parallel to the axis of rotation of the gear cassette and remains not parallel to the axis of rotation of the gear cassette throughout its entire range of motion. The spatial link may be an over-constrained spatial 6R linkage. The fixed link may be attached to the bicycle frame. The cage assembly may be pivotally connected concentrically on the floating link. The cage assembly may be pivotally connected eccentrically on the floating link.

In accordance with various embodiments, an actuation force may be applied to the derailleur to cause motion from a first position to a second position. At least one return mechanism may be utilized to urge the derailleur from the second position towards the first position. The actuation force may be a mechanically, electrically, or hydraulically driven. The return mechanism may include at least one spring selected from one of the group of a torsion spring, and/or an extension spring. The input activation of the linkage may be via a mechanical cable. The input activation of the linkage may be via an electronic servo. The input activation of the linkage may be via a hydraulic plunger.

In accordance with various embodiments, a derailleur for a bicycle may include a frame having a gear cassette mounted thereon. The derailleur may also include a stationary link and a floating link. The path of the floating link may be substantially linear through substantially all of the floating link's range of motion. The floating link may be operable to move a drive member. The drive member may be operable to engage a gear cassette. The stationary link may be operable to be biased to be substantially stationary relative to a frame having the gear cassette mounted thereon. The gear cassette may have an axis of rotation. The stationary link may be positioned on the frame adjacent the gear cassette.

In accordance with various embodiments, the gear cassette is a rear gear cassette operably associated with a rear wheel. Alternatively, the gear cassette may be a front gear cassette operably associated with a crank. The pulley axes of the cage assembly may remain parallel to the axis of rotation of the gear cassette throughout its entire range of motion. The linear derailleur may include a spatial link that is an over-constrained spatial 6R linkage. The Stationary link may be positioned relative to and attached directly or indirectly to the bicycle frame. The cage assembly may be pivotally connected concentrically on the floating link. The cage assembly may be pivotally connected eccentrically on the floating link. An actuation force may be applied to the derailleur to cause motion from a first position to a second position, and at least one return mechanism may be utilized to urge the derailleur from the second position towards the first position. The actuation force may be a mechanically, electrically, or hydraulically driven. The return mechanism may include at least one spring selected from one of the group of a torsion spring, and/or an extension spring. The input activation of the linkage may be via a mechanical cable. The input activation of the linkage may be via an electronic servo. The input activation of the linkage may be via a hydraulic plunger.

In accordance with various embodiments, a bicycle may include a frame having a gear cassette mounted thereon, the gear cassette having an axis of rotation, and a drive member engaging the gear cassette. The bicycle may also include a derailleur positioned on the frame adjacent the gear cassette. The derailleur may have a stationary link and a floating link. The path of the floating link may be substantially linear through substantially its entire range of motion. The stationary link may be connected to the floating link via a first linkset and a second linkset. Each linkset may have a plurality of axes of rotation. The axes of rotation in the first link set are not parallel to the axes of ration in the second linkset.

BRIEF DESCRIPTION OF THE DRAWINGS

FIG. 5A illustrates a side view of a linear derailleur in accordance with an exemplary embodiment;

FIG. 5B illustrates a rear view of the linear derailleur of FIG. 5A in accordance with an exemplary embodiment;

FIG. 5C illustrates a top view of the linear derailleur of FIG. 5A in accordance with an exemplary embodiment;

FIG. 5D illustrates a side isometric view of the linear derailleur of FIG. 5A in accordance with an exemplary embodiment;

FIG. 5E-F illustrate a rear view of extended and contracted linear derailleurs in accordance with an exemplary embodiment;

FIG. 6A-B illustrate a side view of a concentric linear derailleur in accordance with an exemplary embodiment;

FIG. 9A-B illustrate rear and top isometric views of a linear derailleur in accordance with an exemplary embodiment;

DETAILED DESCRIPTION

The present disclosure is related to a derailleur mechanism for a bicycle used to change the position of the drive chain relative to individual cogs/sprockets on the bicycle drive train. In one example, the cogs/sprockets are a part of the rear dive mechanism on the rear wheel. The drive chain is moved via a remote control known as a shifter. A change in the active rear wheel drive cog changes the gear ratio between the front chain-ring (power input) and rear wheel (power output).

The present disclosure differs from traditional derailleurs in that the derailleur pulley axes remain substantially constant relative to the wheel axis throughout the entire travel range. This particular relative movement is achieved by providing a derailleur with a linear linkage mechanism. As an example, the linear derailleur includes an over-constrained 6R spatial linkage (e.g. a Sarrus linkage) which is capable of substantially linear motion of the floating link. As a result, the angles of the pulley axes and the wheel or crank axis remain constant relative to one another. This linear motion allows for either of a concentric or eccentric mounting of the derailleur cage on the linkage system.

Figure 1:
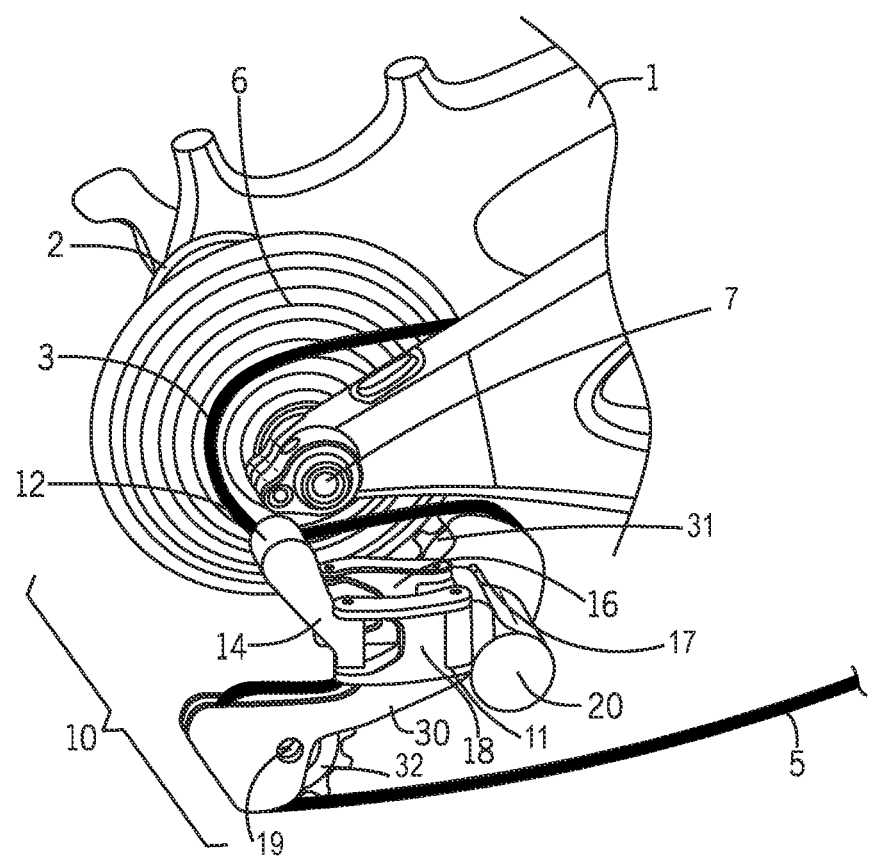
FIG. 1 illustrates a typical embodiment of a prior art rear derailleur for a bicycle.
Figure 2:
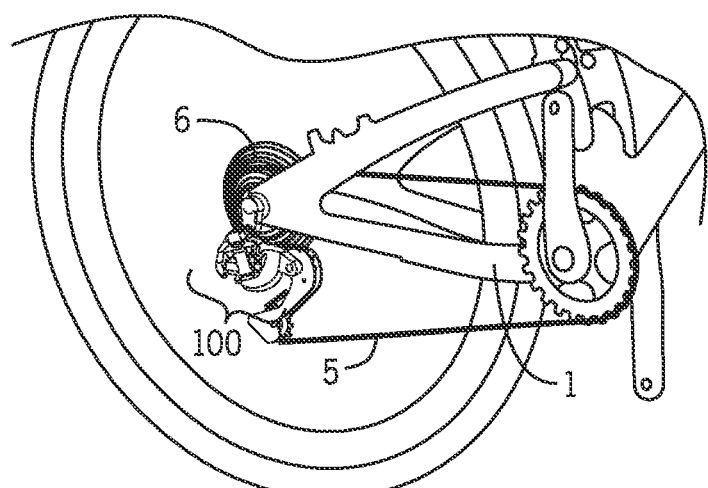
FIG. 2 illustrates an isometric view of a rear wheel of a bicycle having a derailleur.

Despite being discussed in the embodiment of a rear derailleur herein, a person of ordinary skill in the art will appreciate that the concepts and elements of the linear derailleur 100 can also be adapted to be utilized as a front derailleur on a bicycle in addition to or in the alternative of a rear derailleur. However, as an example to be discussed in more detail herein and as shown in FIG. 2, the linear derailleur 100 may hang from the rear triangle 1 of a bicycle in order to shift the drive mechanism 5 (e.g. chain belt or the like) between the rear cogs on a cassette 6. As a matter of orientation and as shown in FIG. 2, the forward direction may be in the X direction, the upward direction may be in the Y direction, and the front side direction may be in the Z direction, which is shown at the rear wheel rotation axis.

In accordance with various embodiments, a bicycle includes a linear derailleur 100. For example, the linear derailleur is a rear derailleur 100. As illustrated by way of example in FIG. 3A, the linear derailleur 100 includes a hanger 3 which hangs from the rear triangle 1 (not shown) to suspend the derailleur 100 from the bicycle.

In the various embodiments, the linear derailleur 100 includes a movable connection 110. The movable connection 110 is formed of a mechanism operable to drive at least a portion of the cage assembly 30 in a linear path. In one example, the movable connection 110 includes a stationary link 140 that is connected relative to a bike frame, e.g. via the hanger 3 or in some embodiments directly connected to the bike frame 1. In one example, the stationary link 140 is substantially fixed relative to the bike frame. While the term fixed is used herein, it should be appreciated that, the stationary link 140 may have one or more degrees of freedom such as being rotatable relative to the bike frame. This freedom may be substantially limited via use of biasing springs. The degrees of freedom may also or alternatively be restrained via a fastener or similar means such that the stationary link 140 maintains a substantially consistent position relative to the bike frame after assembly. The stationary link 140 may be adjustable via a torsion screw that is operable to make minor adjustments to better calibrate the stationary link and the derailleur in general relative to the cassette. A person of ordinary skill in the art will appreciate typical methods for mounting a stationary link 140 based on understanding of the art and disclosure provided herein.

In various examples, the movable connection 110 includes a floating link 150 that is movably connected to the stationary link 140. The floating link 150 moves in a substantially rectilinear relationship to the stationary link 140. As such, the floating link 150 is substantially constrained to a single rectilinear degree of freedom. While particular mechanisms that connect the floating link 150 to the stationary link 140 are discussed herein in greater detail, it should be appreciated by a person of ordinary skill in the art that other rectilinear connections may be incorporated as well. For example, the floating link 150 to the stationary link 140 can be connected via a linear rail mechanism or other linear mechanisms suitable to maintain the rectilinear degree of movement between the floating link 150 and the stationary link 140.

The stationary link 140 includes a frame connection operable to keep the stationary link 140 positioned relative to the frame as discussed above. In one example, the stationary link 140 is contiguously formed with the frame. In another example, the stationary link 140 is removably connected directly to the frame. In another example, the stationary link 140 is connected to a frame bracket (e.g. a derailleur hanger 3).

Figure 3A:
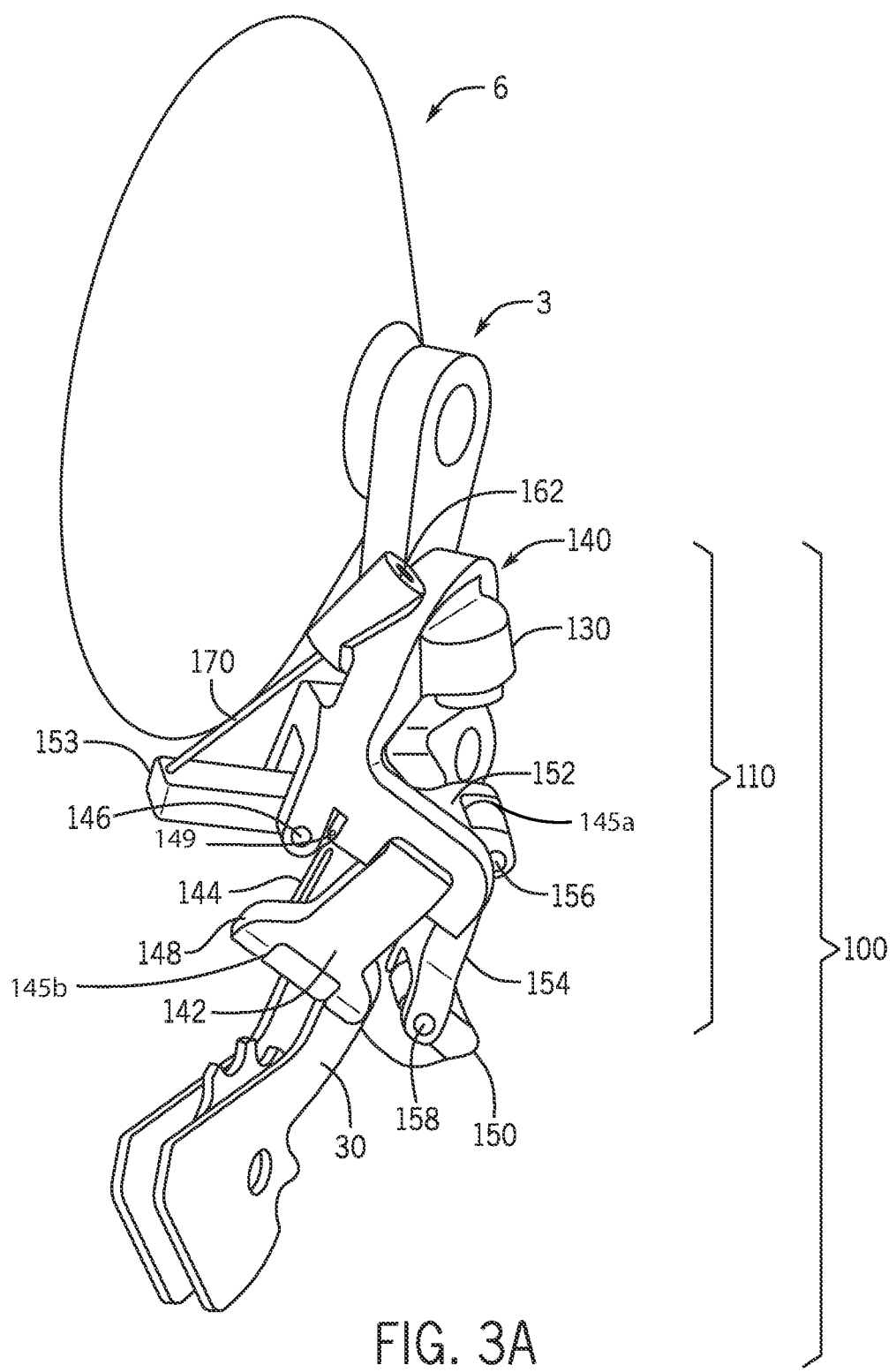
FIG. 3A illustrates an isometric rear view of a linear derailleur in accordance with an exemplary embodiment.
Figure 3C:
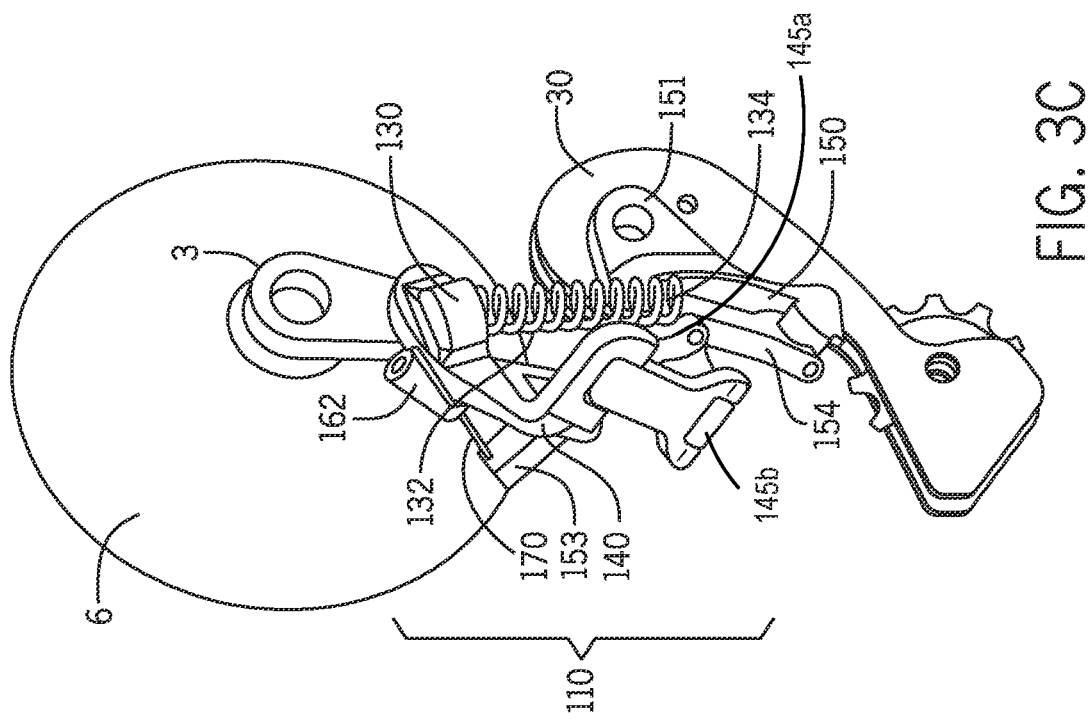
FIG. 3C illustrates an isometric side view of an extended configuration of the linear derailleur of FIG. 3A in accordance with an exemplary embodiment.
Figure 3B:
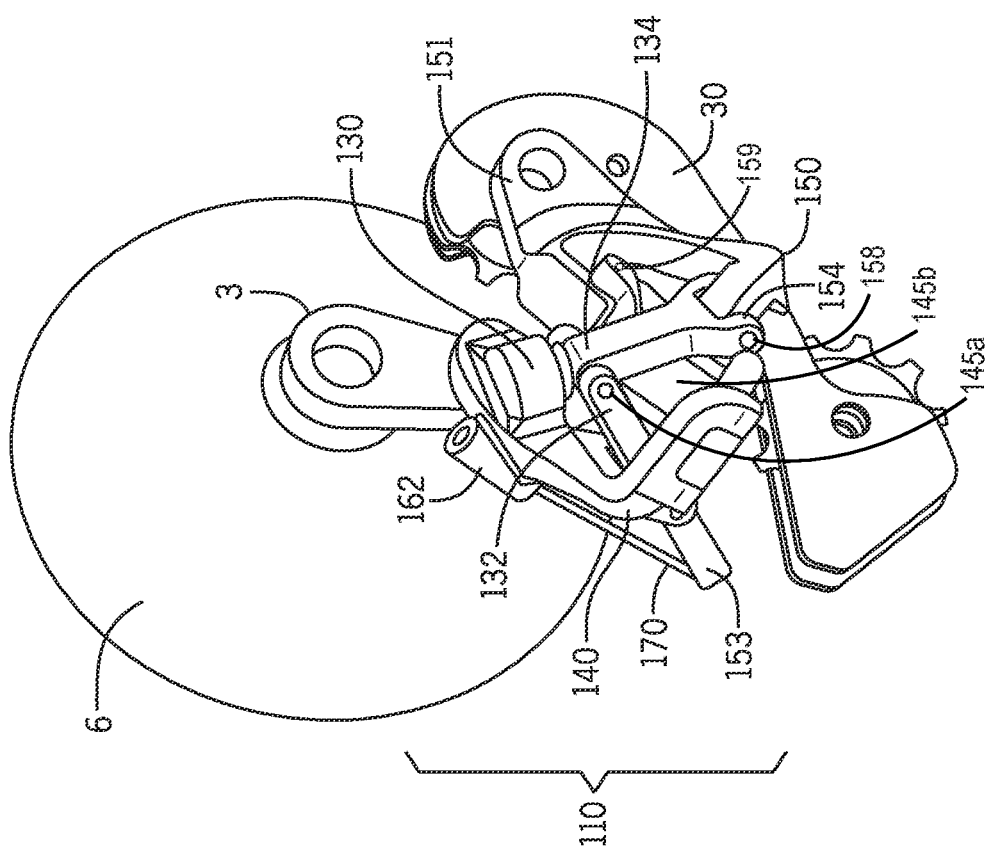
FIG. 3B illustrates an isometric side view of a retracted configuration of the linear derailleur of FIG. 3A in accordance with an exemplary embodiment.

In accordance with various embodiments, the derailleur 100 includes an actuator 170 that is operable to move the stationary link 140 and the floating link 150 relative to one another. The stationary link 140 may have a bracket 162 operable to retain, contact, or mount an actuator to form an actuator mounting feature. In one example, as shown in FIGS. 3A-C, the stationary link may have a bracket 162 suitable for retaining cable 170 forming a cable bracket. In the example, the cable bracket 162 is operable to house the cable and/or mount a cable adjustment barrel to the stationary link 140. However, other actuator setups are also envisioned herein as discussed herein with regards to FIGS. 8-9, which variously show setups including a piston/linear servo set up and a rotary servo set up variously mounted to the stationary link 140.

Figure 3D:
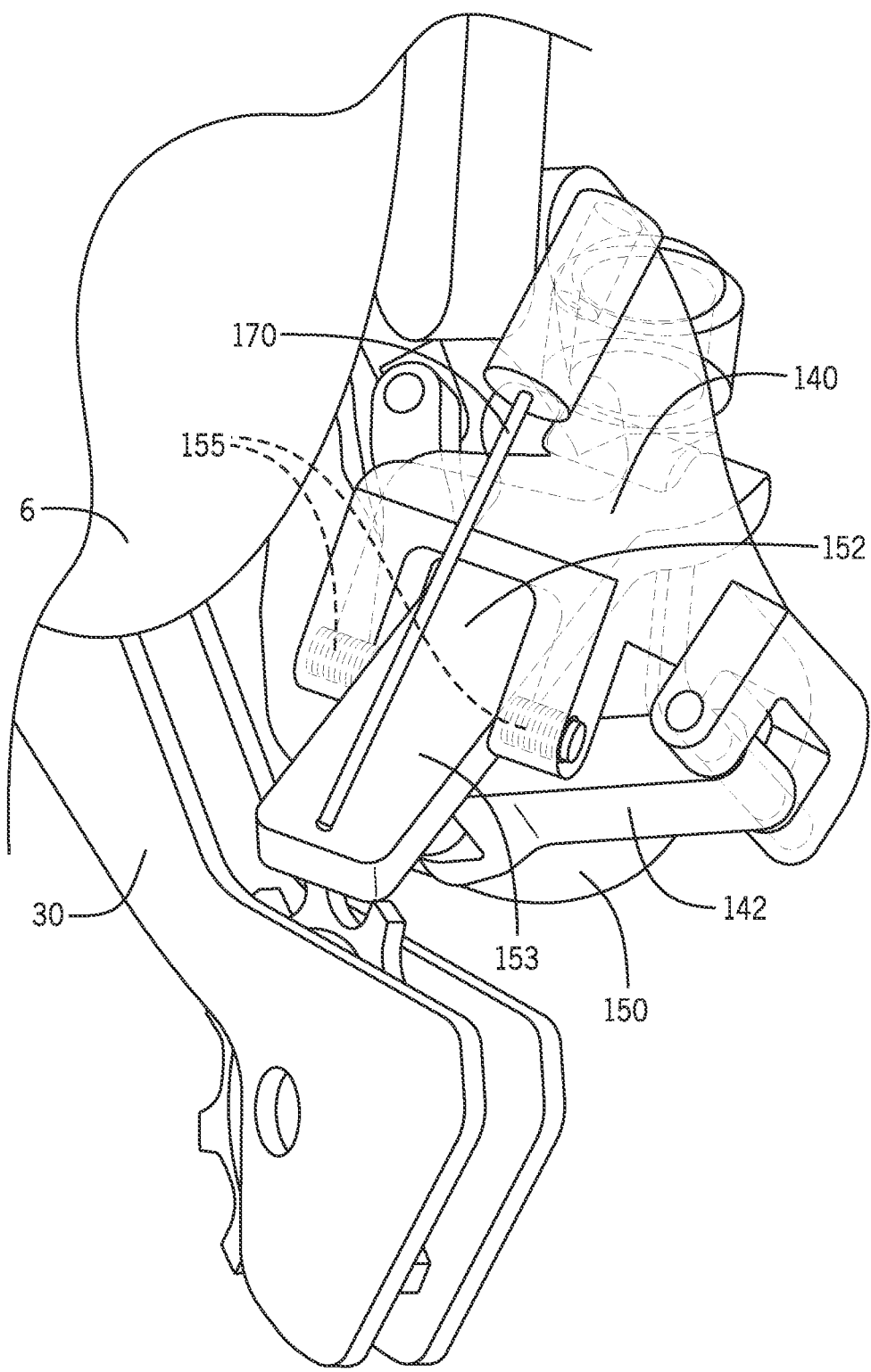
FIG. 3D illustrates a isometric rear view of the derailleur of FIG. 3A in accordance with an exemplary embodiment.

In accordance with various embodiments, the derailleur 100 includes a biasing mechanism 132 that is operable to return the stationary link 140 and the floating link 150 to an unactuated position in the absence of an opposing force from actuator 170. The stationary link 140 may also have a mount 130 for a biasing mechanism 132. A biasing mechanism may be operable to return the derailleur system to a compressed, extended, or intermediate state absent force from the actuator. As an example, mount 130 may retain an extension spring on the stationary link 140. A second mount 134 may be positioned on the movable connection 110 and operable to retain the opposite end of the biasing mechanism 132. Other mechanisms may be used in addition to or as alternatives to the extension spring. For example, as shown in FIG. 3D one or more torsion springs 155 may be attached between the various links (e.g. a first link 152 and the stationary link 140 discussed in more detail herein) to bias the floating link 150 toward an unactuated position such as the collapsed configuration shown. As such, a derailleur cage assembly 30 that includes of an upper pulley or jockey pulley 31, and a lower pulley or idler pulley 32 is pivotably attached to the floating link 150. One or more return springs 132 or 155 can be used to provide a force opposite to that of the actuation force. By way of example, these biasing mechanisms 132 can be torsion springs 155 located at one or more of the linkage pivots, or one or more extension springs 132 connected to two points in the mechanism. However, it is appreciated that other biasing mechanism may be used as well.

In accordance with various embodiments, the derailleur 100 includes a cage assembly 30 comprising jockey and idler pulleys. In various examples, the floating link 150 includes a cage hanger portion 151 operable to keep the floating link 150 positioned relative to the derailleur cage 130. The floating link 150 may be contiguously formed with the derailleur cage 30, connected directly to the derailleur cage 30, or connected to a bracket extending from the derailleur cage 30. In this way, at least a portion of the derailleur cage 30 moves in the same rectilinear motion as the floating link 150. This movement may allow the derailleur cage 30 to align with the cassette 6 such that the chain/belt 5 can move between separate gear rings. The mount between the floating link 150 and the derailleur cage 30 may be concentric with the jockey pulley or it may be eccentric with the jockey pulley.

In accordance with various embodiments, the movable connection 110 may be formed via one or more link sets. For example, the connection 110 includes a first link set 145a and a second link set 145b. The first link set 145a includes a first link 152 and a second link 154 that are rotatably connected to each other at a hinge 156. The second link set includes a third link 142 and a fourth link 144 that are rotatably connected to each other at a hinge 148. One or more of the links such as link 152, as shown in the FIGS. 3A-C, may include a link extension 153 that is connected to an actuator 170 (e.g. actuation cable or piston). From this position, the actuator 170 can contract the link extension 153 toward the actuator mount 162. This action causes the floating link 150 to extend away from the stationary link 140 in a rectilinear path. In other embodiments, a servo may rotate link 152 with respect to the stationary link 140 similarly causing the floating link to extend away from the stationary link.

Each of the first link set 145a and the second link set 145b are rotatably connected to each of the stationary link 140 and the floating link 150 via hinges 146, 149, 158, and 159. For example, the stationary link 140 may include the first hinge joint 146 and the second hinge joint 149 operable to connect to links 152 and 142, respectively. The floating link 150 may include the third hinge joint 158 and a fourth hinge joint 159 as shown in FIG. 3B. The joints 158, 159 are operable to connect the floating links to links 154 and 144, respectively.

In accordance with various embodiments and as discussed above, the movable connection 110 is a linkage that provides a single degree of freedom in a rectilinear motion. For example, the movable connection 110 is an over-constrained 6R spatial linkage (such as e.g. a Sarrus linkage) which is capable of providing substantially rectilinear motion between the stationary link 140 and the floating link 150. Such a structure allows the derailleur 100 to have a substantially rectilinear motion created by the over-constrained 6R spatial linkage (such as a Sarrus linkage). This structure overcomes the non-linearity issues associated with a typical derailleur structure. Furthermore, this derailleur structure also may allow a smaller package to reduce interference with other components or ground effects during riding. The Sarrus linkage is an example of a 6R spatial mechanism. A 6R spatial mechanism is one that includes 6 links with revolute joints and at least one link axis is not parallel to another within the system. Accordingly, the Sarrus linkage is significantly different than the traditional parallelogram linkage typically used in derailleurs today.

In accordance with various embodiments, each of the hinges of the movable connection 110 has an axis. At least one of the axes through the hinge joints of the movable connection 110 forms an angle other than 0 degrees or 180 degrees with respect to at least one other axis. The two axes may, however, be planar or skew with respect to each other. In various embodiments, each of the hinge axes associated with the first link set 145a are parallel and each of the hinge axes associated with the second link set 145b are parallel. However, in this embodiment, the hinge axes of the first link set 145a and the hinge axes of the second link set 145b are not parallel.

The following information related to an over-constrained mechanical system is provided below to provide a broader understanding of the applicability, structure and theory of the system without any intention on being bound by the theory provided herein. As indicated above, a 6R spatial linkage, such as a Sarrus linkage, may be incorporated into a derailleur system, which may be used in the various structure provided herein. Such a linkage may include two special properties: 1) It is an over-constrained mechanism; and 2) The linkage is capable of rectilinear motion.

To touch on the theory underlying various linkages, the following analysis known as the Mobility Analysis of Mechanisms (Kutzbach (or Grubler) mobility criterion) can be used to describe the mobility of a linkage. The mobility m of a linkage composed of n links that are connected with p joints:

$$\text{mobility}=m=6(n-p-1)+\Sigma f$$

n=number of links
p=number of joints
Σf=sum of the kinetic variables in the mechanism Revolute joints or rotary hinges allow one degree of freedom movement between the two links they connect. For an n-link closed loop linkage with revolute joints:

$$\Sigma f=n$$

$$p=n$$

$$m=6n-6p-6+n$$

$$m=6n-6n-6+n$$

$$m=n-6$$

So in general, to obtain a mobility of one a linkage with revolute joints needs at least seven links. However, it was found that this criterion is not always a necessary condition to achieve mobility. It is possible for there to be a specific geometric condition of a linkage allowing mobility even though it does not obey the mobility criterion. This type of mechanism is called an over-constrained mechanism. In the case of a Sarrus linkage:

$$m=6-6=0$$

However, the Sarrus Linkage has m=1 which makes it over-constrained.

As illustrated in the schematic diagram of the linkage system provided in FIGS. 4A-D, an over-constrained 6R spatial linkage and its links include a stationary link 140 corresponding to the fixed side of the linkage and a set of non-stationary links. The non-stationary links include floating link 150, linkset 145a, and linkset 145b. The linkset 145a may include links 142 and 144. The linkset 145b may include links 152 and 154. As illustrated in this example, all three axes N, P, and R of linkset 145a are parallel. Additionally, as illustrated in this example, all three axes M, Q, and S of linkset 145b are parallel.

Figure 4A:
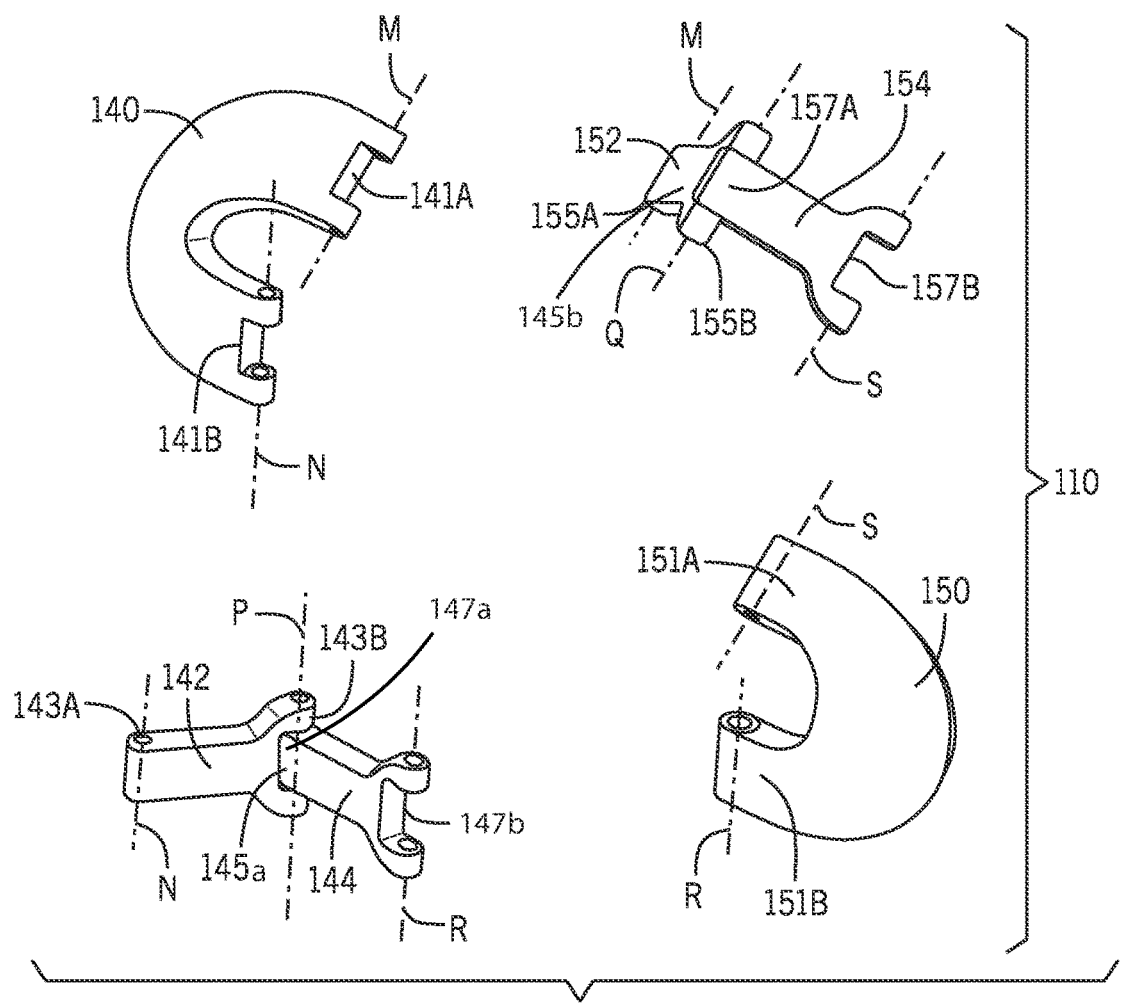
FIG. 4A illustrates an exploded view of an exemplary linkage of a linear derailleur.
Figure 4B:
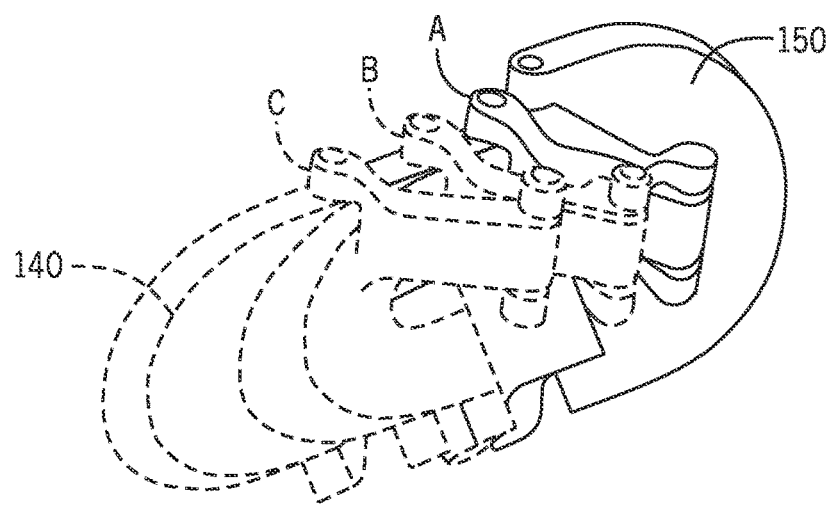
FIG. 4B illustrates an isometric view of a plurality of different positions along a linear path.

In accordance with various embodiments, each of a pair of end links (e.g. the stationary link 140 and the floating link 150) can include two rotatable connection portions such as connectors 141a, 141b or 151a, 151b. Each mid link such as linkset 154a and 145b includes rotatable connection portions (e.g. 155a, 157b, 143a, or 147b) that are operable to engage with the connectors of the end links. The connections may be made via the matching of the rotatable axes of each component piece as shown for example in FIG. 4A. For example, M of link 140 with M of link 152, S of link 154 with S of link 150, R of link 150 with R of link 147b, and N of link 142 with N of link 140. This assembly allows for the linear actuation of an example of the motion mechanism 110 in a linear derailleur 100. As shown in FIG. 4B, the rectilinear path of floating link 140 relative to stationary link 150 passes through the adjacent linear positions denoted by A, B, and C in the figure. A is a collapsed position. B is an intermediate linear position. C is an expanded linear position.

Figure 4C:
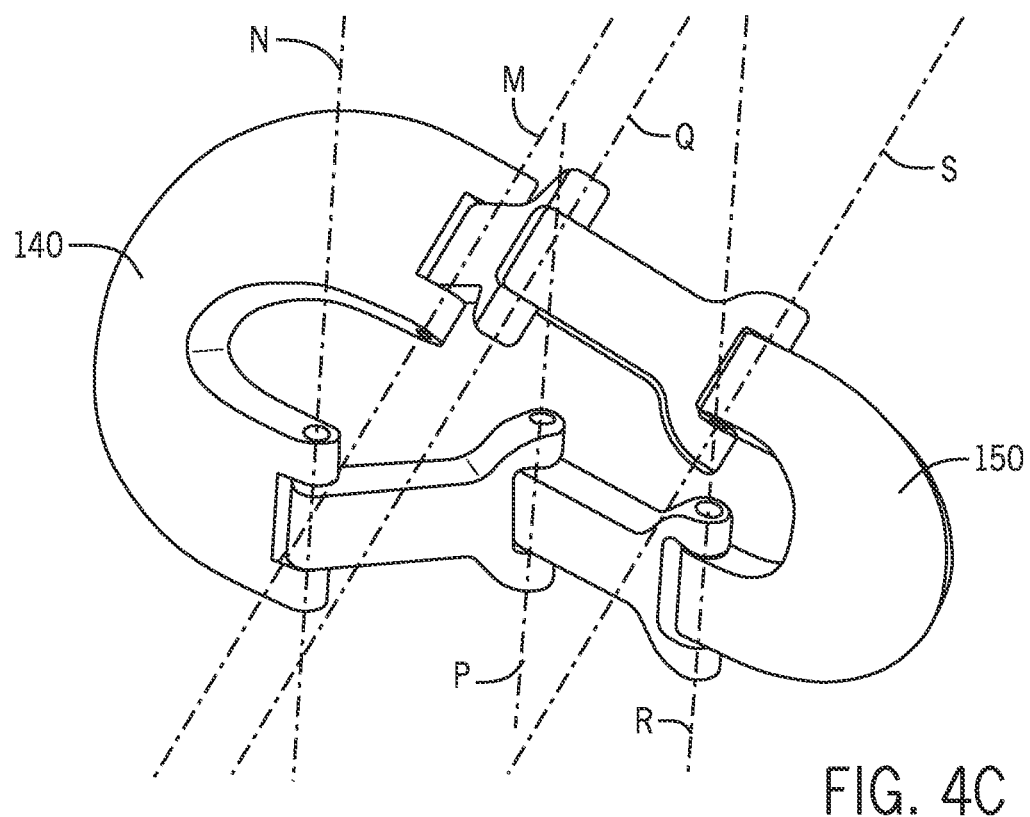
FIG. 4C illustrates an isometric view of an example linkage with linksets having different axes of rotation.
Figure 4D:
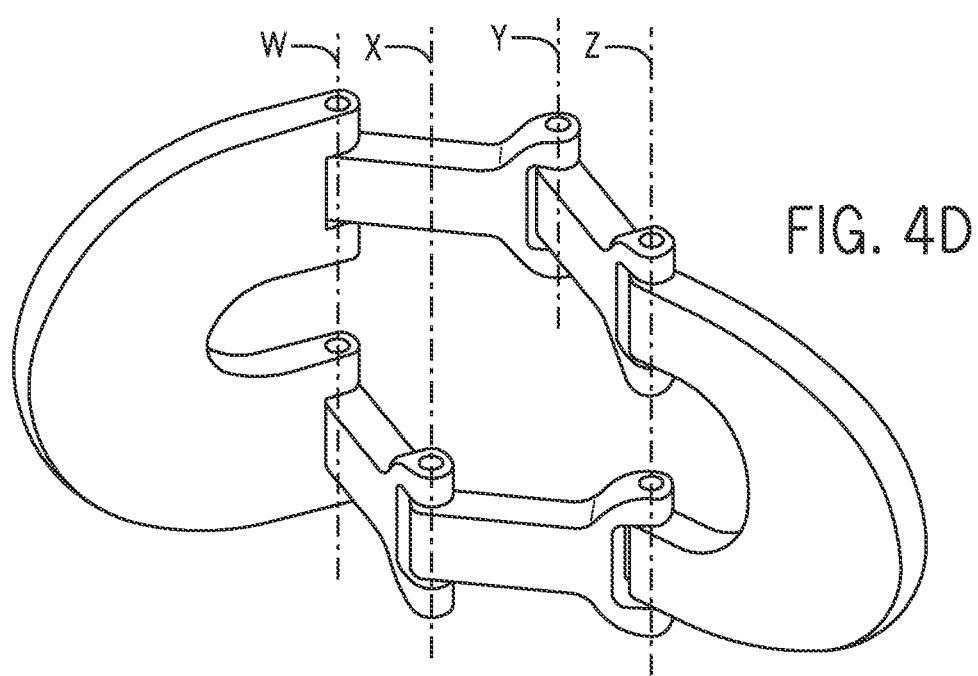
FIG. 4D illustrates an isometric view of a counter example linkage with linksets having parallel axes of rotation.

Again not to be bound by theory but to provide a broader disclosure, it is understood theoretically that in order for the spatial linkage to constrain the floating link 150 to a rectilinear path, certain conditions should be met. In one embodiment, with a 6R linkage, R denoting revolute joints or rotary hinges that allow one degree of freedom movement between links (see e.g. FIG. 4A), all three pivot axes of the first linkset 145a are be parallel to each other, all three pivot axes of the second linkset 145b are parallel to each other, and the first linkset's pivot axes N, P, and R are not parallel to the second linkset's 145b pivot axes M, Q, and S. Such a system is illustrated in FIG. 4C. The floating link is constrained to a rectilinear path and may be suitable for use in one or more of the various linear derailleur embodiments as described in this disclosure.

Figure 4E:
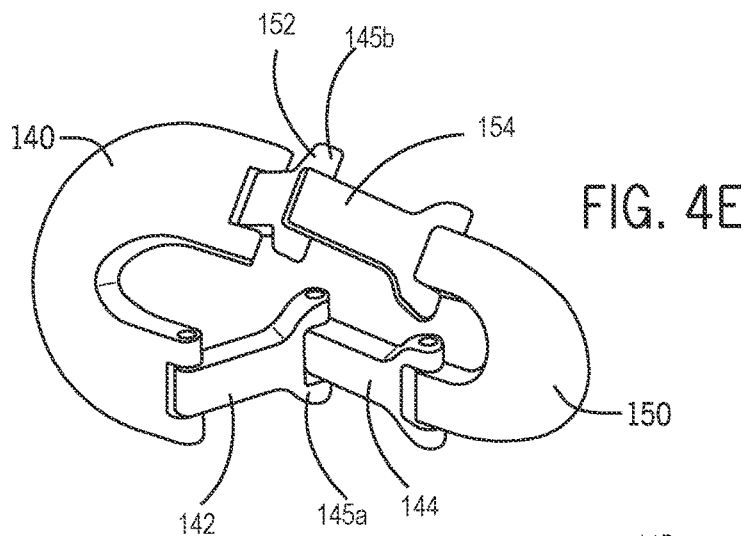
FIG. 4E illustrates an isometric view of an example linkage with a cross configuration.
Figure 4F:
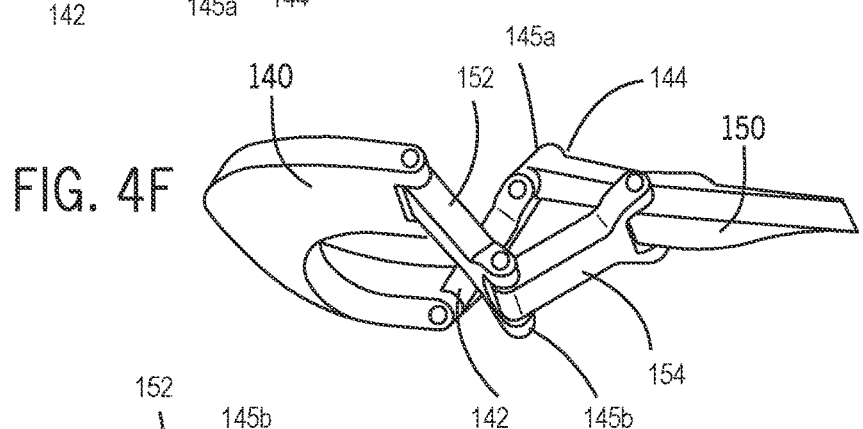
FIG. 4F illustrates an alternate isometric view of an example linkage with a cross configuration.
Figure 4G:
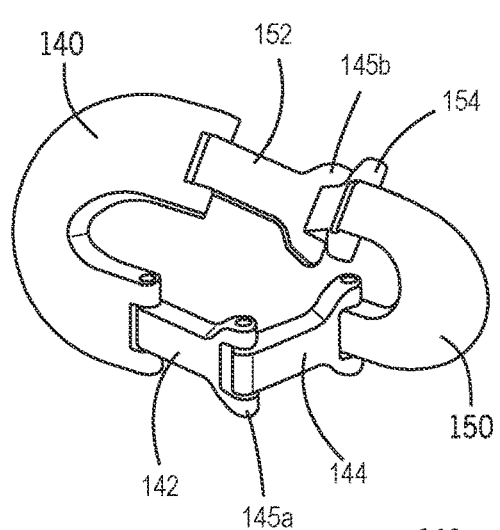
FIG. 4G illustrates an isometric view of an example linkage with an open configuration.
Figure 4H:
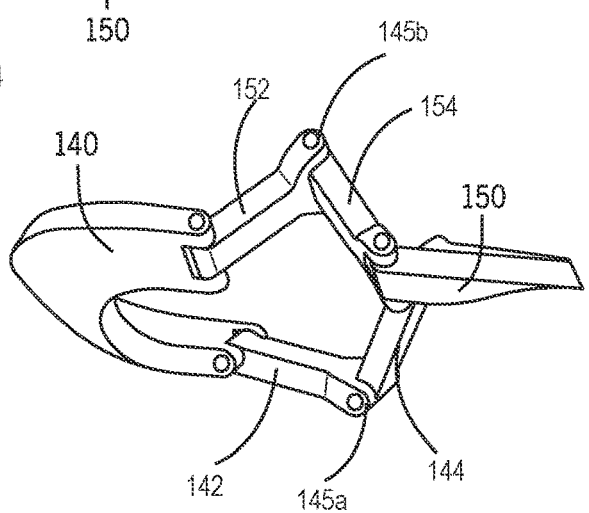
FIG. 4H illustrates an alternate isometric view of an example linkage with an open configuration.

The structure provided herein allows for great flexibility to tune the mechanism to have the desired design goals since many variables can be modified. For example, the linksets can be configured in a crossed configuration as illustrated in FIGS. 4E and 4F. Or in another example, the linksets can be configured in an open configuration as illustrated in FIGS. 4G and 4H.

The mounting positions on the stationary and floating links can vary as well. For example, the floating link 150 can have longer or shorter connection portions 151a, 151b. In another example, the stationary link 140 can have longer or shorter connection portions 141a, 141b. Additionally or alternatively, the pivot axes can be rotated. Additionally, the mechanism can be rotated and still achieve the same linear motion. In the various embodiments, the lengths of links 142, 144, 152 and 154 can vary independently of the mechanism's 110 linear motion. With rectilinear actuation, the mechanism 110 can be rotated in any direction and the travel of the floating link 150 is the same linear path. In a structure that holds the bottom link portion stationary (e.g. stationary relative to the bike frame), the upper floating link moves linearly along the path A, B, and C shown in FIG. 4B. With the mechanism rotated 90 degrees and the lower link stationary, the upper link still moves in the same linear fashion in the exact same path. This is in contrast to the traditional parallelogram linkage, which would have an output motion that is curvilinear. That curvilinear path would also rotate 90 degrees, creating a new orientation in contrast to the mechanism illustrated in FIGS. 4A-H. By maintaining the same path independent of the lower/upper link rotation orientation, there is a lot of flexibility in setting the linkage orientation while achieving the same or substantially similar resultant path of travel.

Modifying the adjustable variables affects many attributes of the linkage but do not necessarily affect the linear path. A few examples of the attributes that may be affected by the adjustable variables include stiffness, travel range, packaging, mechanism envelope, actuation ratio relative to motion, and actuation point.

With regards to stiffness, the lateral stiffness of the mechanism 110 changes depending on the linkset angles and individual link lengths. This stiffness change is in addition to the link depth and width, the material, and the pivot construction, e.g. bearing/bushing and axle type/size. For instance, the closer 145a and 145b are to perpendicular, the stiffer the linkage generally is. So although theoretically the linksets' 145a and 145b axes are operable to achieve linear motion of the floating link with the axes slightly out of parallel, in practicality this would be difficult to achieve due to flex in individual links and revolute joint tolerances. As such, as angles between the linksets' respective axes angles approach perpendicular, the stiffness is increased. With regards to travel range, the longer the links 142, 144, 152 and 154, typically the longer the travel range. As such, by maximizing the length of the links 142, 144, 152 and 154 relative to the desired package size, the travel of the derailleur is maximized.

With regards to packaging, meaning the location of the derailleur's fixed side mounting, the fixed link can be located in many locations in 3d space to achieve the same linear path. The linear derailleur is not sensitive to the orientation of the stationary link 140's position because the movement is rectilinear from that location, whereas systems with a curvilinear path are sensitive to the orientation of the stationary link. With regards to the mechanism envelope, the linkset's location and orientation can be configured to minimize the mechanism envelope. For example and as illustrated in FIG. 4E-4F, the linkset 145a and the linkset 145b can be placed into a crossed pattern so that the linksets 145a and 145b fold in on themselves to save space. The cross pattern is also helpful to prevent interference between the links during the travel range. Alternatively as illustrated in FIG. 4G-4H, the linkset 145a and the linkset 145b can be placed into an open configuration. An open configuration provides additional packaging room between the station link 140 and the floating link 150 that could be occupied by additional derailleur features.

With regards to actuation ratio relative to motion, the actuation ratio can be changed simply by modifying individual link 142, 144, 152 and 154 lengths. This can be done with little to no effect on the constrained linear motion of the mechanism. With regards to actuation point, any non-stationary link can be used to activate the motion of mechanism 110 motion. Utilizing any non-stationary link provides options in design since the envelope and packaging of various alternative portions of the derailleur can be utilized with the linear derailleur. Thus, more design freedom is allowed.

Referring back to FIG. 2, a global coordinate system relative to a bicycle is provided. The origin is coincident to the rear axle axis and the centerline of the bike. X-positive is the direction the bicycle travels straight forward. Y-positive is upwards direction perpendicular to the ground. Z-positive is collinear to the wheel axis pointing towards the drive-side of the bicycle. Therefore, the cassette sprockets and front chain-ring(s) are parallel to the XY plane. Furthermore, the global axes of rotation of this coordinate system are also defined. X is the roll axis, Y is the yaw axis, and Z is the pitch axis. The standard right-hand rule denotes polarity.

In the traditional linkage design used in rear derailleurs, e.g. a planar 4-bar linkage forming a parallelogram, the resultant path defined is non-linear or curvilinear. The axes of the parallelogram are not parallel to the wheel axis. As a result, the upper and lower pulley axes do not remain parallel to the wheel axis throughout the entire range of motion. In contrast, the linear derailleur, such as one with a spatial linkage, constrains the path of the rear derailleur floating link 150 to a substantially rectilinear motion. This is unique in that the spatial linkage constrains the floating link 150 to a substantially rectilinear path as opposed to a non-linear or curvilinear path. The rectilinear path that the floating link 150 and, therefore, the derailleur cage 30 takes can be, but does not have to be, parallel to the XY, YZ, or XZ planes. Depending on the design intent, the linear path can be located anywhere in 3d space near the rear wheel cogs.

As illustrated in FIGS. 5A-D, an example linear Path is shown in the XY plane (FIG. 5A), YZ plane (FIG. 5B), XZ plane (FIG. 5C), and isometric view FIG. 5D. The path in each of these views forms a rectilinear path extending from the top right of each figure to the bottom left. The floating link 150 and some portion of cage 30 follows these paths in their respective rectilinear motion. By moving the cage 30 in such a consistent manner, overall shifting and functionality of the derailleur is improved over traditional types.

The system discussed herein may be influenced by the angular relationship between the derailleur pulley axes and the wheel axis throughout the travel range of the mechanism. With the global coordinate system defined the yaw angle, the roll angle, and the pitch angle can be discussed to define the rotation of the pulley axes in three dimensional space. With regards to the yaw angle, the yaw angle is the rotation of the pulley wheel axes about the global yaw axis Y. It is the angular value of one of the pulley axes projected onto the XZ plane measured relative to the Z axis. With regards to the roll angle, the roll angle is the rotation of the pulley wheel axes about the global roll axis X. It is the angular value of one of the pulley axes projected onto the YZ plane measured relative to the Z axis. With regard to the pitch angle, the pitch angle is the rotation of the pulley wheel axes about the global pitch axis Z. It is the angular value of one of the pulley axes projected onto the XY plane measured relative to the Y axis.

Figure 7A:
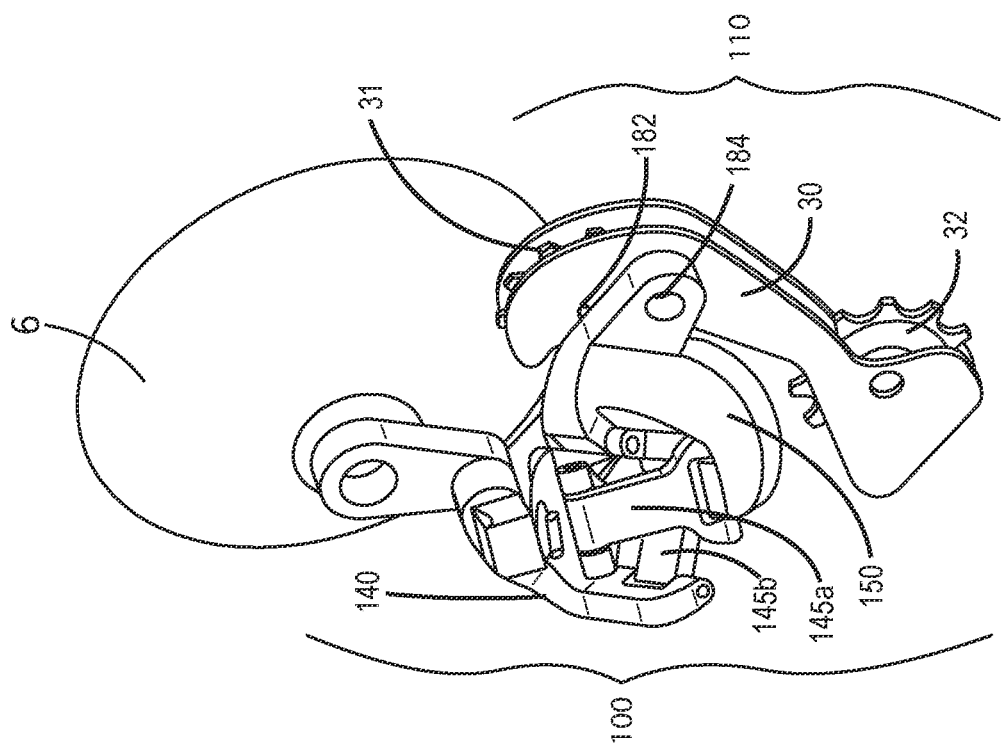
FIG. 7A-B illustrate a side view of an eccentric linear derailleur in accordance with an exemplary embodiment.
Figure 7B:
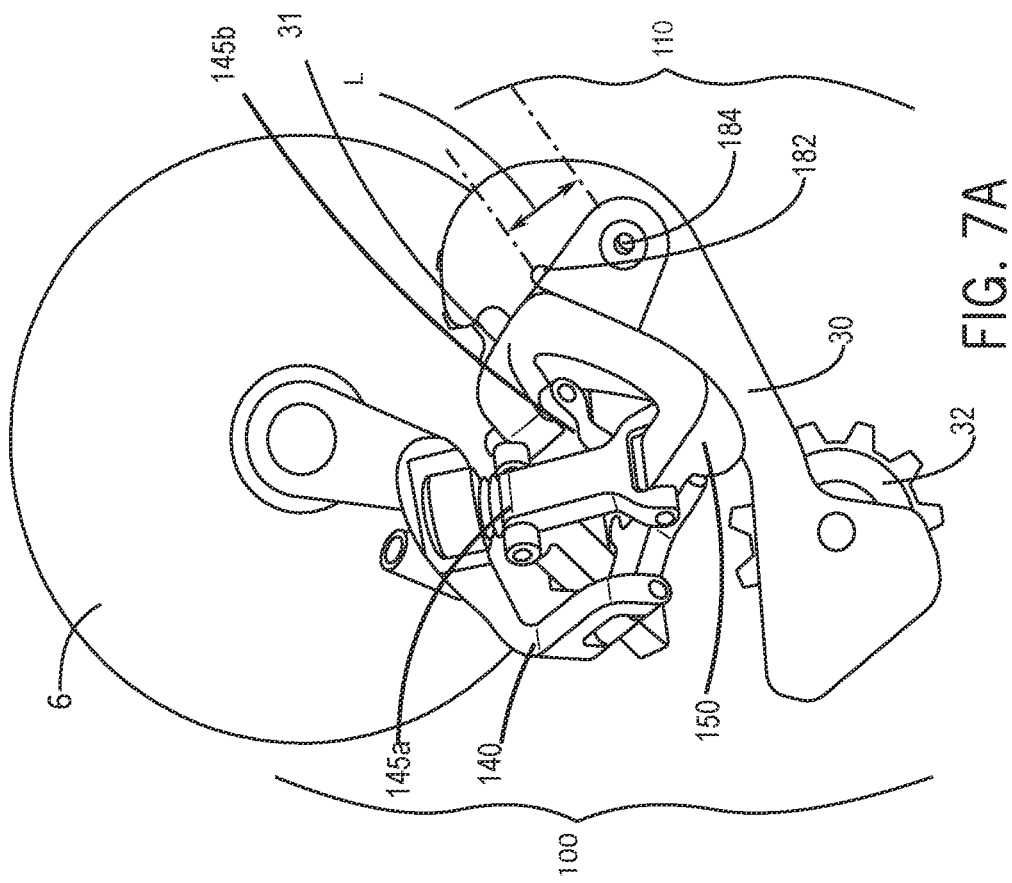

As discussed herein and illustrated in FIGS. 6A and 6B, the derailleur cage assembly 30 includes an upper pulley or jockey pulley 31, and a lower pulley or idler pulley 32. The derailleur cage assembly 30 is pivotally mounted to the floating link 150. There are many possible configurations of pivotally attaching the derailleur cage assembly 30 to the floating link 150. The different configurations affect the motion of the jockey 31 and idler pulley 32 throughout the travel of the derailleur 100. In one example and as illustrated in FIGS. 6A-B, the cage assembly 30 can be mounted on the floating link 150 with the jockey pulley 31 positioned concentrically relative to the pivotal attachment 182. In a second example and as illustrated in FIGS. 7A-B, the cage assembly 30 can be mounted on the floating link 150 with the jockey pulley 31 positioned at an eccentric pivot 184, which is eccentric to the jockey pulley 31 pivot. This eccentricity affects the motion of the jockey pulley throughout the travel of the derailleur. With the linear motion mechanism 110, an eccentrically mounted cage assembly 30 moves in a rectilinear path at the eccentric mount 184. Pivoting about the eccentric mount 184 allows an alternate relative movement between the jockey pulley 31 and the idler pulley 32, allowing for greater flexibility in tuning the derailleur to the application. Adjusting the linear distance L between the jockey pulley pivot 182 and the eccentric pivot 184 adjusts the relative rotation of the jockey pulley 31 relative to the eccentric pivot 184 and the relative rotation of the idler pulley 32 relative to the eccentric pivot 184.

In accordance with one embodiment, the pivotal attachment between the cage 30 and the floating link 150 (e.g. either concentrically or eccentrically) can be oriented so that the jockey 31 and idler pulley 32 axes are not parallel to the wheel axis indicated by Z. This orientation can be relative to yaw, roll or pitch. As a result, the angles A1 of the derailleur pulley 31, 32 axes relative to the wheel axis Z remain constant throughout the entire travel range of the mechanism. Depending on the cassette 6 and chain ring configuration, adjustment of the angles of the derailleur pulleys 31, 32 relative to the wheel axis may optimize shifting performance by maximizing efficiency of the chain/belt 5 and cassette 6 engagement and may minimize wear from dropped chains/belts 5. Accordingly, in various embodiments and referring to FIGS. 5E-F, the jockey and idler pulley axes 182, 184 are not parallel to the wheel axis in roll. For example, the angle between the jockey and idler pulley axes 182, 184 and the wheel axes Z is greater than 1 degree. In a more particular example, the angle between the jockey and idler pulley axes 182, 184 and the wheel axes Z is from 1 to 5 degrees. In a still more particular example, the angle is about 2 degrees.

In accordance with one embodiment, the pivotal attachment between the cage 30 and the floating link 150 (e.g. either concentrically or eccentrically) can be oriented so that the jockey 31 and idler pulley 32 axes are substantially parallel to the wheel axis indicated by Z. Depending on the cassette and chain ring configuration, this may optimize shifting performance by maximizing efficiency of the chain/belt sprocket system and may minimize chain wear from dropped chains/belts. As an example and again referring to FIGS. 5E and 5F, the jockey and idler pulley axes 182, 184 are substantially parallel to the wheel axis. Stated another way, the angle between the pulley axes 182, 184 and the wheel axis Z is approximately zero.

As noted previously, an actuation force may cause movement in the derailleur linkage in either an electro-mechanical or mechanical control system; there is an actuation ratio between the actuation force input and derailleur output that dictates the amount of relative motion the derailleur moves as the shifter is actuated. There is a ratio between the amount of actuator movement (e.g. cable pull, piston/linear servo throw, or radial servo rotation) to the amount of lateral movement (movement in the direction of the wheel axis to force the chain to shift cogs) of the derailleur. With a typical parallelogram design, the mechanism's linkage path is dependent upon the link lengths and axes geometry. In order to achieve an optimum linkage path and actuation ratio in a parallelogram mechanism, it is common to add additional complex features such as pulley wheels and extended links. These items add weight and complexity.

Figure 14:
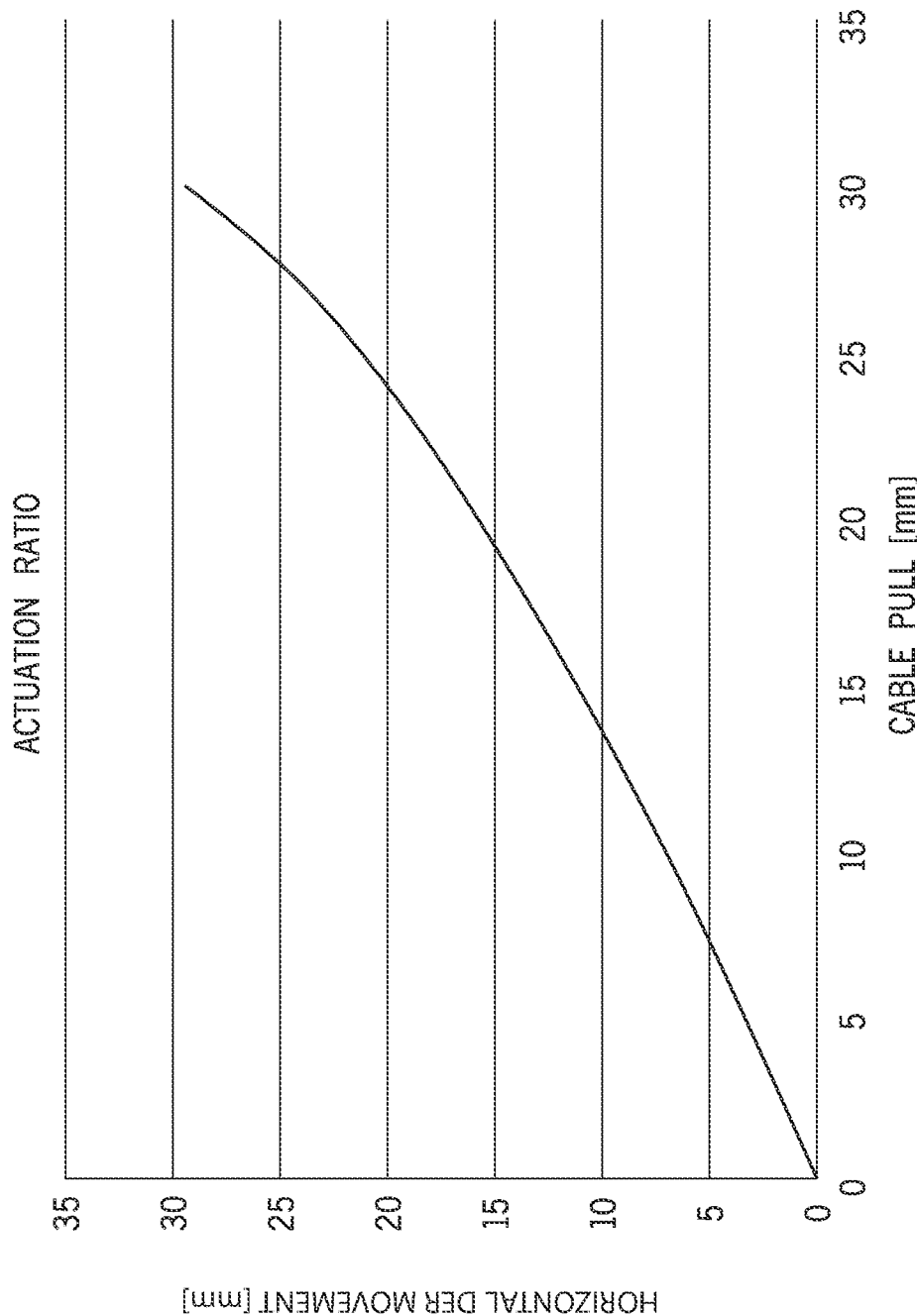
FIG. 14 is a graph comparing the derailleur movement with the actuation movement.

With the disclosed structure and mechanism, the lengths of the individual links of linkset 145a and linkset 145b can vary independently of the linear path of the mechanism. Therefore, the actuation ratio of the mechanism can be tuned independent of the mechanism's linear path. For example, FIG. 14 illustrates one particular example of an actuation ratio using a mechanical cable on a linear derailleur. As shown, the y axis of the table indicates the distance in mm that the linear derailleur moves and the x axis indicates the corresponding distance of cable pull to achieve the derailleur movement.

Figure 10:
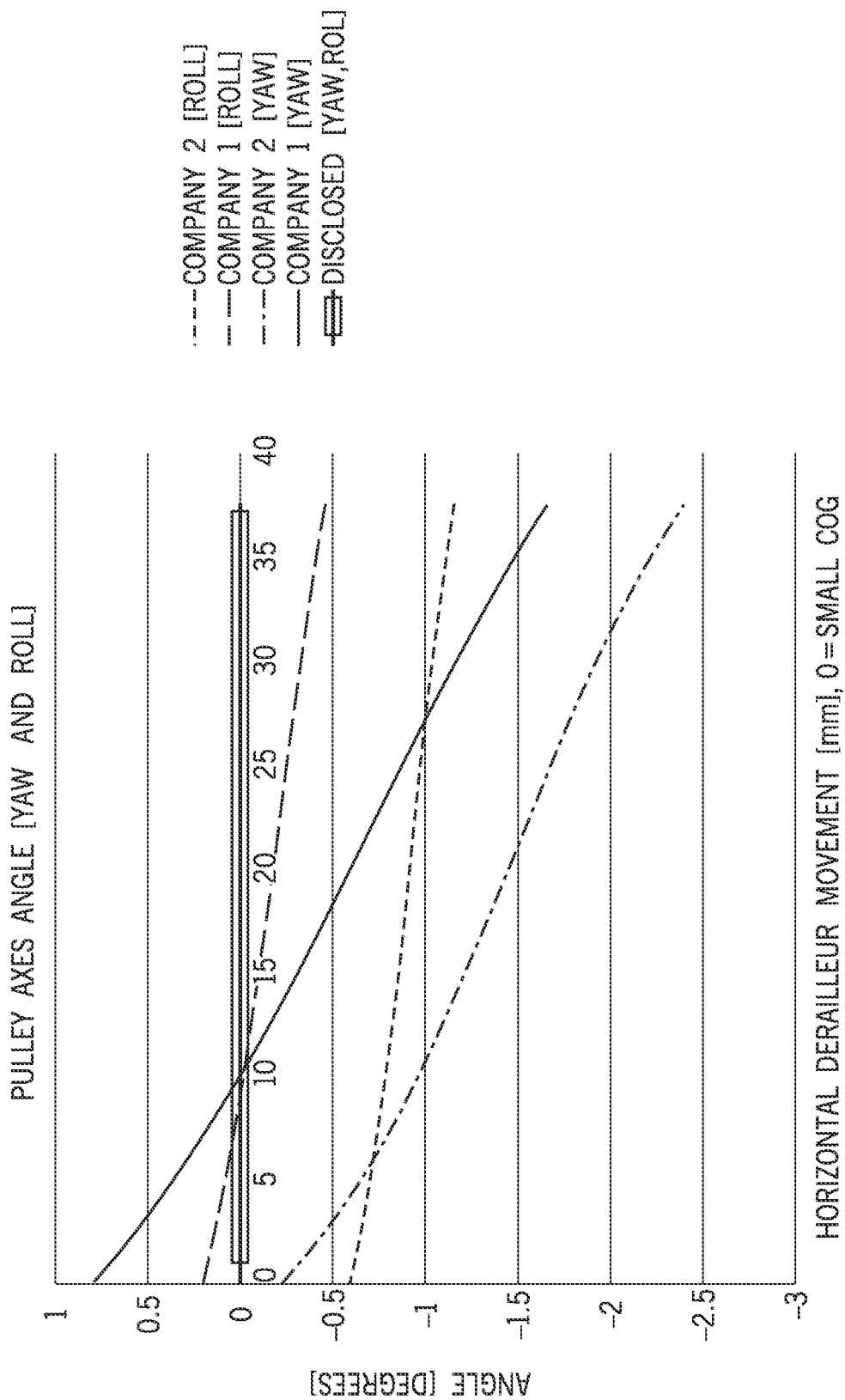
FIG. 10 is a graph comparing the horizontal derailleur movement of various derailleurs with the resultant angles of the pulley axes as the yaw and roll.
Figure 11:
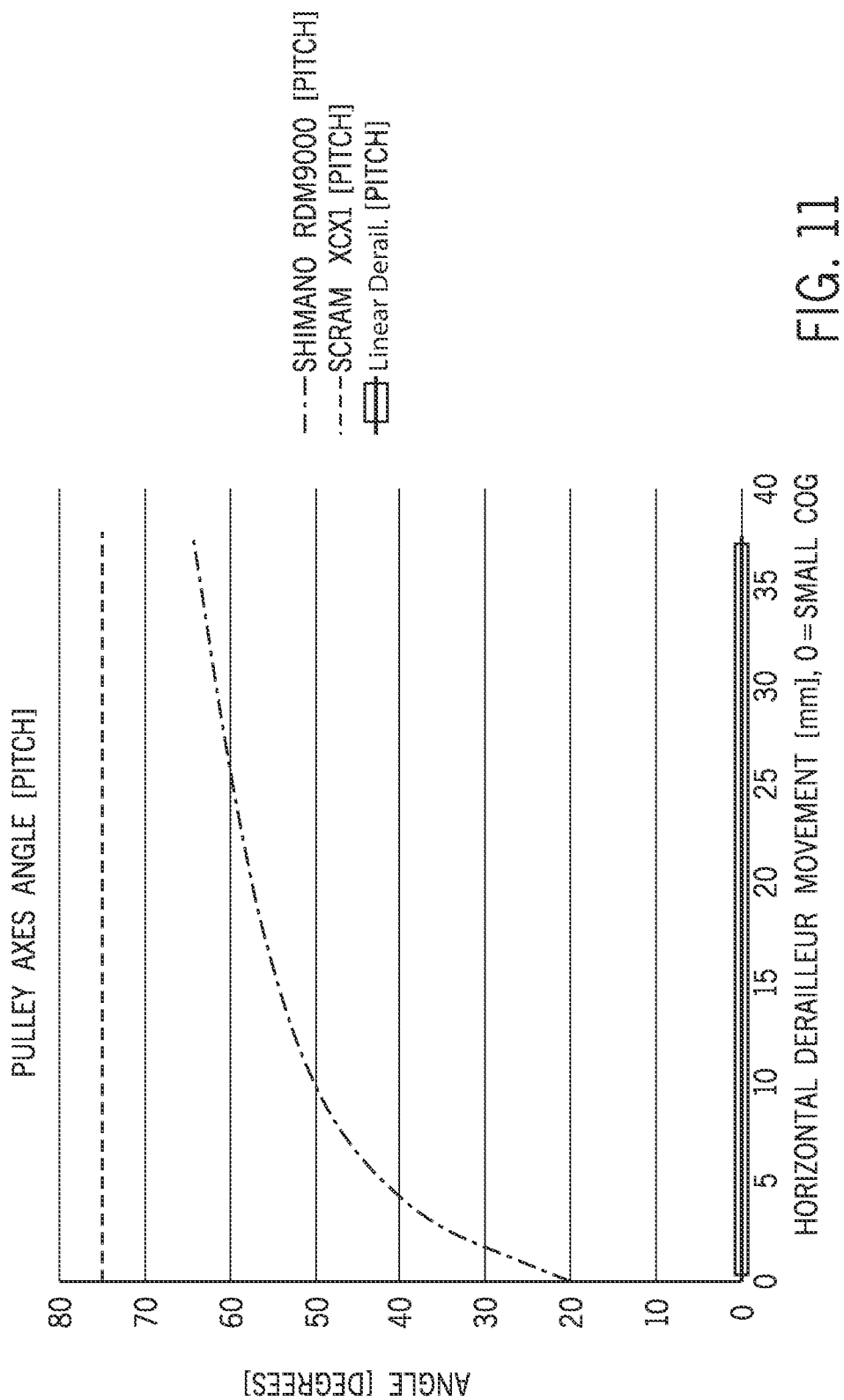
FIG. 11 is a graph comparing the horizontal derailleur movement of various derailleurs with the resultant angles of the pitch of the pulley axes.
Figure 12:
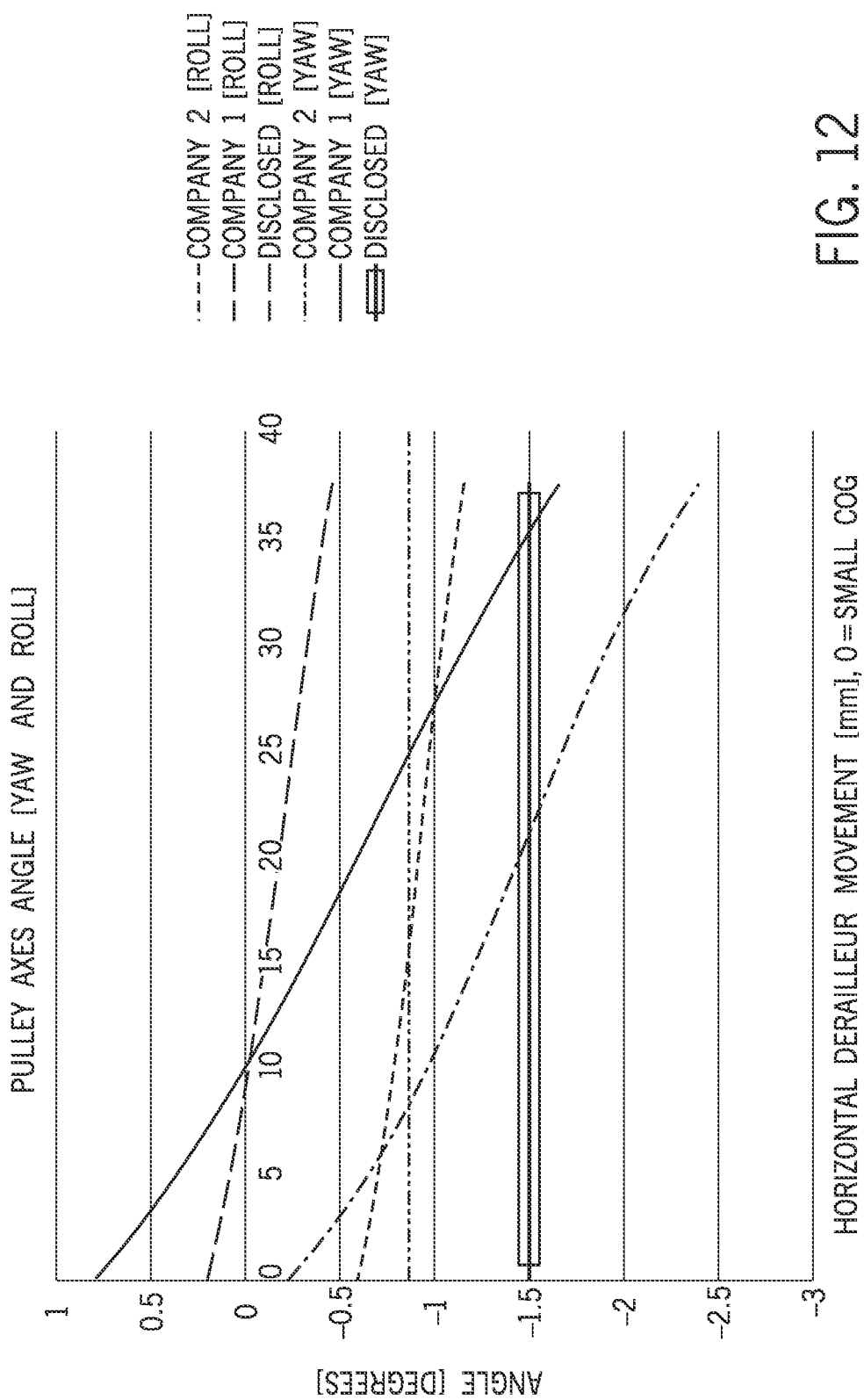
FIG. 12 is a graph comparing the horizontal derailleur movement of various derailleurs with the resultant angles of the pulley axes as the yaw and roll.

FIGS. 10-14 are graphical representations of tests or models based on the linear derailleurs discussed herein compared to two different parallelogram designs provided by separate companies. In each comparison the derailleur SRAM XX1 is provided by Company 1 and the derailleur Shimano Rdm9000 is provided by Company 2. FIGS. 10 and 12 are a graphs that shows an example model of the yaw and roll and angle deviation of the derailleur pulley axes for two example parallelogram linkage derailleurs compared to that of the disclosed structure using a rectilinear linkage. Note that in FIG. 10, the pulley axes of the rectilinear linkage derailleur are parallel to the wheel axis throughout the entire travel range in this particular case in both roll and yaw. Both of the parallelogram designs deviate from zero in both roll and yaw. In FIG. 12 the pulley axes of the rectilinear linkage derailleur are set at an angle with the yaw at about −1.5 degrees and the roll at about −0.9 degrees. Still, the linear derailleur remains constant through the range of travel.

Figure 13:
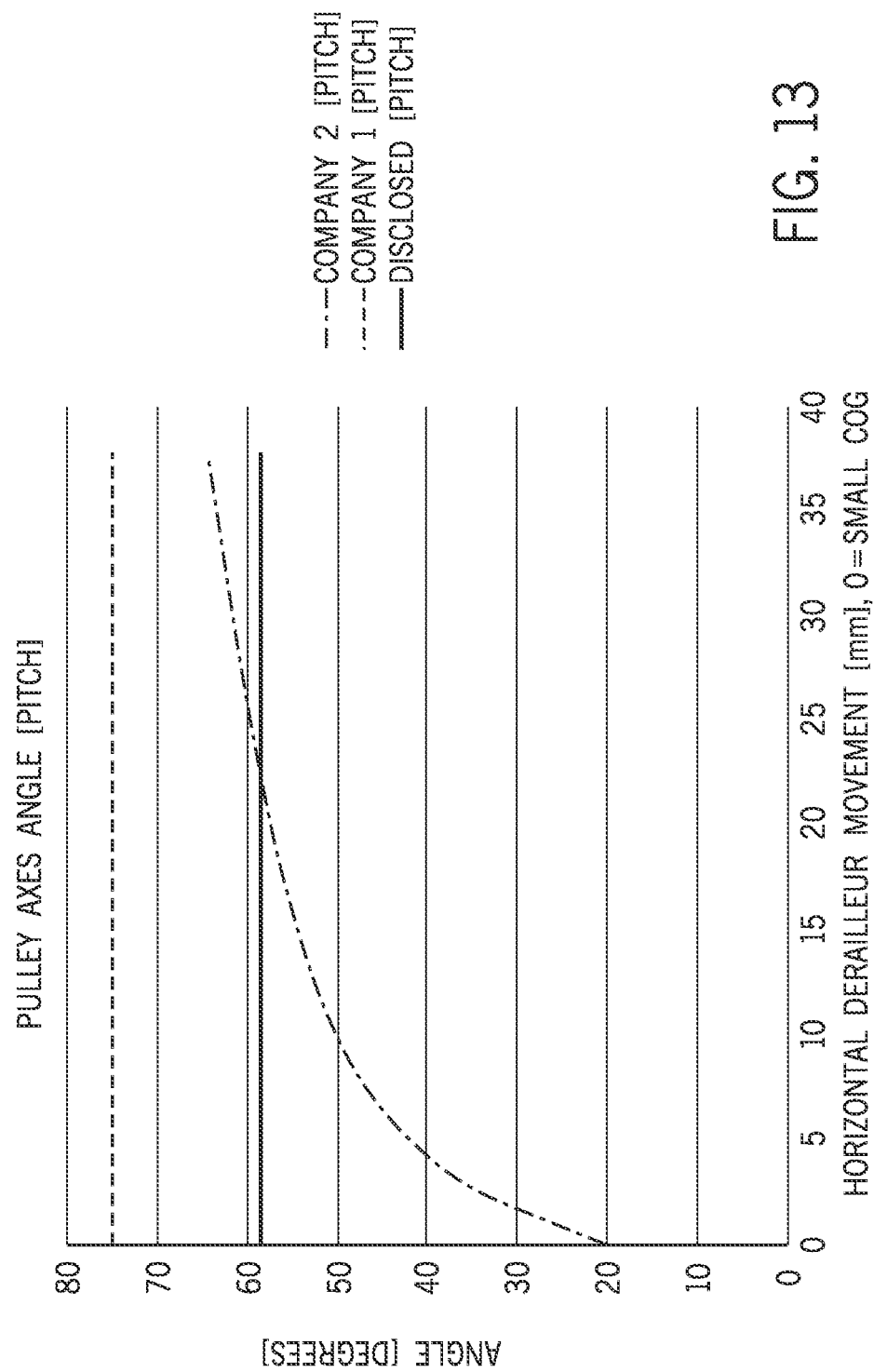
FIG. 13 is a graph comparing the horizontal derailleur movement of various derailleurs with the resultant angles of the pitch of the pulley axes.

FIGS. 11 and 13 are graphs that shows the pitch angle deviation of the derailleur pulley axes for parallelogram linkage of Company 2 and Company 1 compared to that of the disclosed structure which uses a linear derailleur linkage as discussed herein. Note that in FIG. 11, the pulley axes of linear derailleur are parallel to the wheel axis throughout the entire travel range throughout the entire travel range in pitch. However both of the parallelogram designs deviate from zero in pitch but Company 1 does remain constant in pitch unlike Company 2. Also in FIG. 13 with the pitch set at about 90 degrees, the pulley axes of linear derailleur remain constant relative to their initial pitch.

Figure 8:
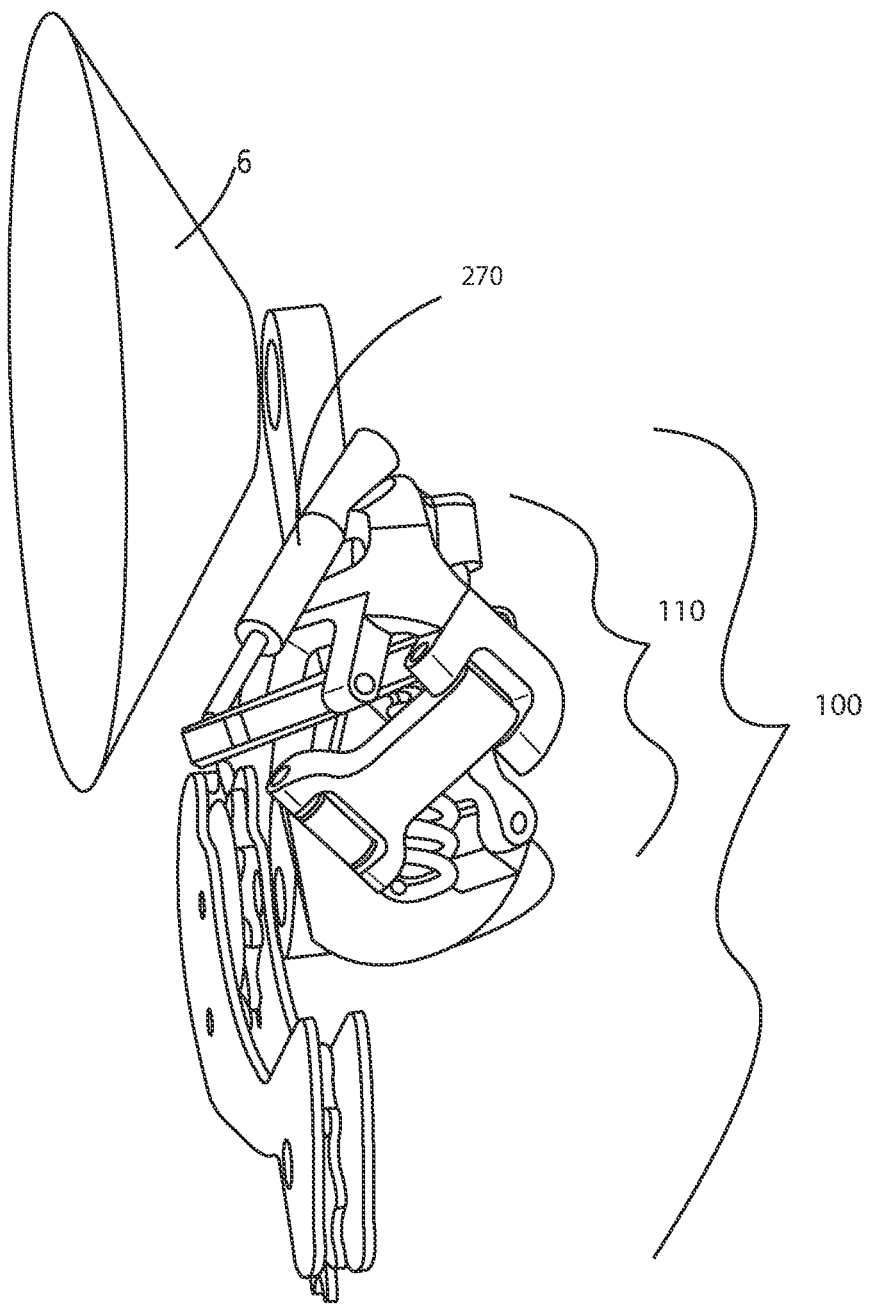
FIG. 8 illustrates an isometric rear view of a linear derailleur in accordance with an exemplary embodiment.

In accordance with various embodiments, as illustrated in FIGS. 8, 9A and 9B, the derailleur receives an actuation force that can be controlled mechanically or electro-mechanically via a known shifter mechanism or electro-mechanical mechanism typically located on or near the handlebars. The actuation force applied can be applied through but is not limited to a mechanical cable (see e.g. FIG. 3A actuator 170), linear/radial electro-mechanical servo (see e.g. FIGS. 9A and 9B actuator 370) or a hydraulic/pneumatic cylinder (see e.g. FIG. 8 actuator 270). In the electro-mechanical control case, the applied actuation force is controlled by an electro-mechanical shifter which is connected to a micro-processor and battery to logically control the desired actuation force and therefore derailleur output motion. In the mechanical control case, the applied actuation force is controlled by a mechanical shifter to mechanically control the desired actuation force and therefore derailleur output motion. Derailleurs are positioned on the bike frame near the front, rear, or both gear cassettes. In embodiments having a rotary servo 370, the servo 370 drives one of the non-stationary links 150 about one of its axes of rotation. There is a ratio between the amount of actuator movement (e.g. cable pull, piston motion, or servo rotation/translation) to the amount of the mechanism's lateral movement (movement in the direction of the wheel axis). Utilizing a linear derailleur helps to improve this ration providing greater control to the bicycle user.

The spatial linkage derailleur hanger constrains the floating link to a rectilinear motion. The relationship between the pulley wheel axes and the wheel axis is operably adjusted for tuning the derailleur performance. The disclosed structure allows the angle of the pulley wheel axes to remain constant throughout the full motion of the mechanism. In various embodiments, the pulley wheel axes may remain parallel to the wheel axis throughout full motion of the mechanism. In other embodiments, the pulley wheel axes may be skewed relative to the wheel axis. The specific motion of the spatial linkage derailleur allows the derailleur to be optimized for efficiency (e.g. less belt or chain wear, improved efficiency, etc.), shifting quality and minimal chances of chain derailment. Also, since the linear motion is independent of the floating link lengths and there is a large amount of freedom for the placement of the floating link axes on both the fixed and floating link. This allows the mechanism to be easily controlled due to flexibility in designing the actuation ratio. In addition the structure lends itself to multiple configurations with a small envelop. This provides more flexibility in bike frame design as well as minimizes the chances of hitting the derailleur on obstacles while riding.

Having described several embodiments herein, it will be recognized by those skilled in the art that various modifications, alternative constructions, and equivalents may be used. The various examples and embodiments may be employed separately or they may be mixed and matched in combination to form any iteration of the alternatives. Additionally, a number of well-known processes and elements have not been described in order to avoid unnecessarily obscuring the focus of the present disclosure. Accordingly, the above description should not be taken as limiting the scope of the invention. Those skilled in the art will appreciate that the presently disclosed embodiments teach by way of example and not by limitation. Therefore, the matter contained in the above description or shown in the accompanying drawings should be interpreted as illustrative and not in a limiting sense. For example, while the various figures shown herein are shown with rear derailleurs, the various concepts are equally applicable to front derailleurs. In such an embodiment, the stationary link may be mounted to a bracket, the seat tube, the crank housing or the like, with the floating link mounting to a chain guide. The floating link and the chain guide may move in a substantially rectilinear path aligning the chain with the front chain rings.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

The following claims are intended to cover all generic and specific features described herein, as well as all statements of the scope of the present method and system, which, as a matter of language, might be said to fall there between.

What is claimed is:

1. A six-bar linkage for a bicycle rear derailleur comprising:
   a stationary link (140);
   a floating link (150);
   a first link (142);
   a second link (144);
   a third link (152);
   a fourth link (154), wherein the links are operatively coupled by at least six joints, and wherein a path of the floating link (150) is constrained to one degree of freedom.

2. The six-bar linkage of claim 1, further comprising a torsion spring positioned about a joint of the at least six joints, wherein the torsion spring resists relative motion between the stationary link (140) and the floating link (150).

3. The six-bar linkage of claim 1, wherein:
   the first link (142) and the second link (144) comprise a first link set (145a); and
   the third link (152) and the fourth link (154) comprise a second link set (145b).

4. The six-bar linkage of claim 3, wherein the first link set (145a) and the second link set (145b) are arranged in a crossed configuration with respect to one another.

5. The six-bar linkage of claim 4, wherein the floating link (150) is configured to move along the path between an extended configuration and a retracted configuration.

6. The six-bar linkage of claim 4, wherein the first link set (145a) and the second link set (145b) are configured to fold in on one another.

7. The six-bar linkage of claim 3, wherein:
the links of the first link set include a first plurality of axes at respective joints therebetween;
the links of the second link set include a second plurality of axes at respective joints therebetween.

8. The six-bar linkage of claim 7, wherein the first plurality of axes is substantially parallel to the second of respective axes.

9. The six-bar linkage of claim 7, wherein the first plurality of axes is not parallel to the second of respective axes.

10. A two-wheeled vehicle comprising:
a frame having a gear cassette mounted thereon, the gear cassette having an axis of rotation;
a drive member engaging the gear cassette;
a derailleur positioned on the frame adjacent the gear cassette, the derailleur comprising a six bar linkage including:
a stationary link (140);
a floating link (150);
a first link (142);
a second link (144);
a third link (152);
a fourth link (154), wherein the links are operatively coupled by at least six joints, and wherein a path of the floating link (150) is constrained to one degree of freedom.

11. The two-wheeled vehicle of claim 10, wherein the derailleur further comprises a torsion spring positioned about a joint of the at least six joints, wherein the torsion spring resists relative motion between the stationary link (140) and the floating link (150).

12. The two-wheeled vehicle of claim 10, wherein the derailleur further comprises:
a cage assembly coupled to the floating link (150), wherein the cage assembly includes:
a derailleur cage,
a first pulley rotationally coupled to the derailleur cage, and
a second pulley rotationally coupled to the derailleur cage, and wherein the first pulley and the second pulley are configured to engage the drive member.

13. The two-wheeled vehicle of claim 10, wherein:
the first link (142) and the second link (144) comprise a first link set (145a);
the third link (152) and the fourth link (154) comprise a second link set (145b).

14. The two-wheeled vehicle of claim 13, wherein the first link set (145a) and the second link set (145b) are arranged in a crossed configuration with respect to one another.

15. The two-wheeled vehicle of claim 13, wherein the floating link 150 is configured to move along the path between an extended configuration and a retracted configuration.

16. The two-wheeled vehicle of claim 15, wherein the first link set (145a) and the second link set (145b) are configured to fold in on one another when the floating link (150) is in one of the retracted configuration.

17. A derailleur for a two-wheeled vehicle comprising:
a six-bar linkage including:
a stationary link (140);
a floating link (150);
a first link (142);
a second link (144);
a third link (152);
a fourth link (154), wherein the links are operatively coupled by at least six joints, and wherein a path of the floating link (150) is constrained to one rectilinear degree of freedom.

18. The derailleur of claim 17, further comprising a torsion spring positioned about a joint of the at least six joints, wherein the torsion spring resists relative motion between the stationary link (140) and the floating link (150).

19. The derailleur of claim 17, wherein:
the first link (142) and the second link (144) comprise a first link set (145a); and
the third link (152) and the fourth link (154) comprise a second link set (145b).

20. The derailleur of claim 19, wherein the first link set (145a) and the second link set (145b) are arranged in a crossed configuration with respect to one another.

* * * * *